US007062157B2

(12) United States Patent
Iwai et al.

(10) Patent No.: US 7,062,157 B2
(45) Date of Patent: Jun. 13, 2006

(54) METHOD AND SYSTEM FOR MODIFYING A DISPLAYED SYMBOLIC IMAGE BASED ON THE ACCURACY OF AN INPUT GEOMETRIC SHAPE

(75) Inventors: Toshio Iwai, Tokyo (JP); Tsutomu Kobayashi, Tokyo (JP); Yuki Kobayashi, Tokyo (JP); Takumi Abe, Kanagawa (JP); Shuichi Ezura, Tokyo (JP); Toshimitsu Ohdaira, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 1169 days.

(21) Appl. No.: 09/846,877

(22) Filed: May 1, 2001

(65) Prior Publication Data

US 2002/0057890 A1    May 16, 2002

(30) Foreign Application Priority Data

| May 1, 2000 | (JP) | ............................. 2000-133014 |
| May 29, 2000 | (JP) | ............................. 2000-159247 |
| Mar. 13, 2001 | (JP) | ............................. 2001-070502 |

(51) Int. Cl.
*H04N 5/781* (2006.01)
*A63F 9/24* (2006.01)
*G06F 17/00* (2006.01)
*G06F 19/00* (2006.01)
*G06G 5/00* (2006.01)

(52) U.S. Cl. .......................... 386/125; 463/30; 463/31; 463/37; 345/619

(58) Field of Classification Search .................. 386/45, 386/125–126; 463/30, 31, 180–83, 37; 345/418–419, 345/619; H04N 5/781
See application file for complete search history.

(56) References Cited

U.S. PATENT DOCUMENTS 6,724,385 B1 * 4/2004 Takatsuka et al. .......... 345/427

6,773,349 B1 * 8/2004 Hussaini et al. ............... 463/38
6,878,066 B1 * 4/2005 Leifer et al. ................... 463/39

FOREIGN PATENT DOCUMENTS

| JP | 10-328414 A | 12/1998 |
| WO | WO 98/32107 | 7/1998 |

OTHER PUBLICATIONS

"Newton MessagePad, Models: original (OMP) and 100 (MP100)"; XP002252115; Online! 1993;<URL:www.msu.edu/~luckie/gallery/mp100.htm>; Retrieved from the internet on Aug. 22, 2003; (pp. 1-5).
European Patent Office; "European Search Report"; cited in corresponding European Patent Application No. EP 01 30 3964; dated Sep. 4, 2003; pp. 1-3.
Japanese Patent Office; "Rejection of the Application"; Mailing No. 035070; Mailing Date: Feb. 12, 2003; 5 pages (including one-page English translation of portions).

* cited by examiner

*Primary Examiner*—Thai Tran
(74) *Attorney, Agent, or Firm*—Fitch, Even, Tabin & Flannery

(57) ABSTRACT

Image processing means comprises image converting means for converting manipulation data inputted by a user with a manual controller or a mouse into an input pattern image, geometric shape judging means for determining a type of an input geometric shape indicated by the input pattern image based on a plurality of geometric shape judging criterion, image appearance displaying means for displaying a symbolic image corresponding to the type of the input geometric shape on the monitor, and image form determining means for determining a form of the symbolic image displayed on the monitor. The image form determining means comprises accuracy calculating means for determining accuracy of the input geometric shape based on the number of deviations from an allowable range of a judging criteria used in judgment for the determined type of the input geometric shape, and modification displaying means for modifying the form of the symbolic image displayed on the monitor based on the accuracy of the input geometric shape.

9 Claims, 41 Drawing Sheets

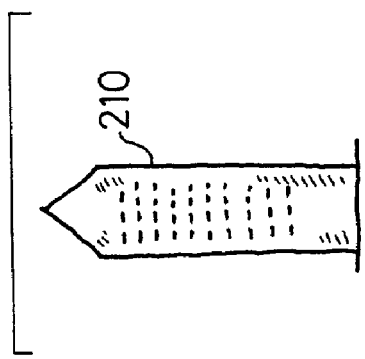  
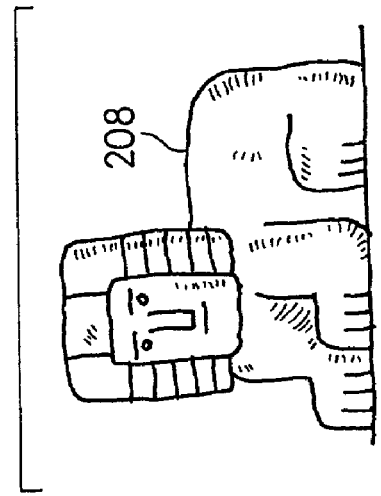  
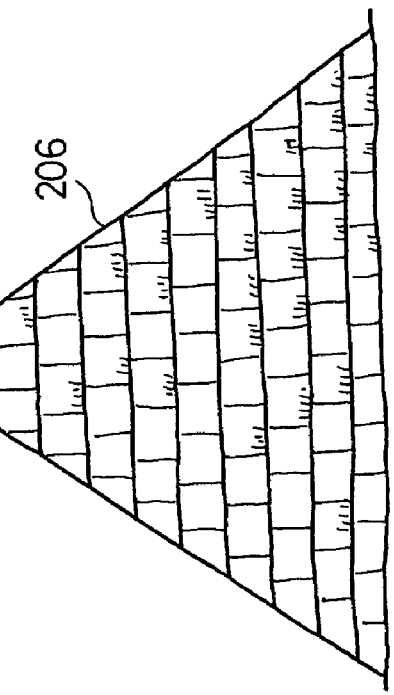  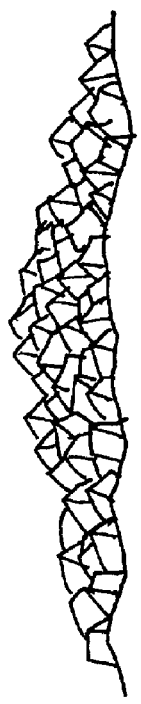
FIG.6A  FIG.6B  FIG.6C FIG.13A  FIG.13B  FIG.13C
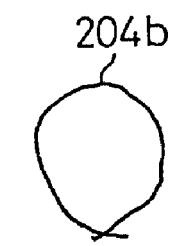
204b
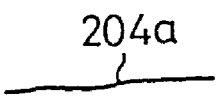
204a
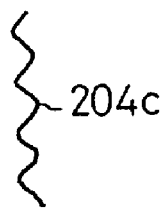
204c
234
236
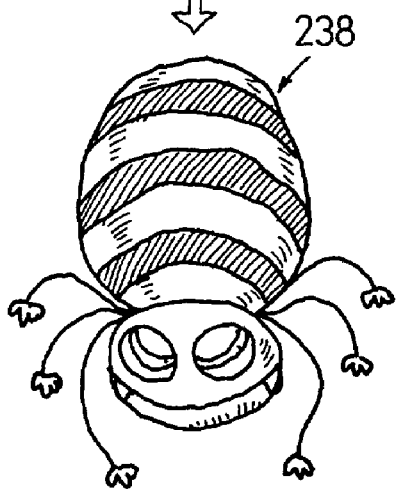
238

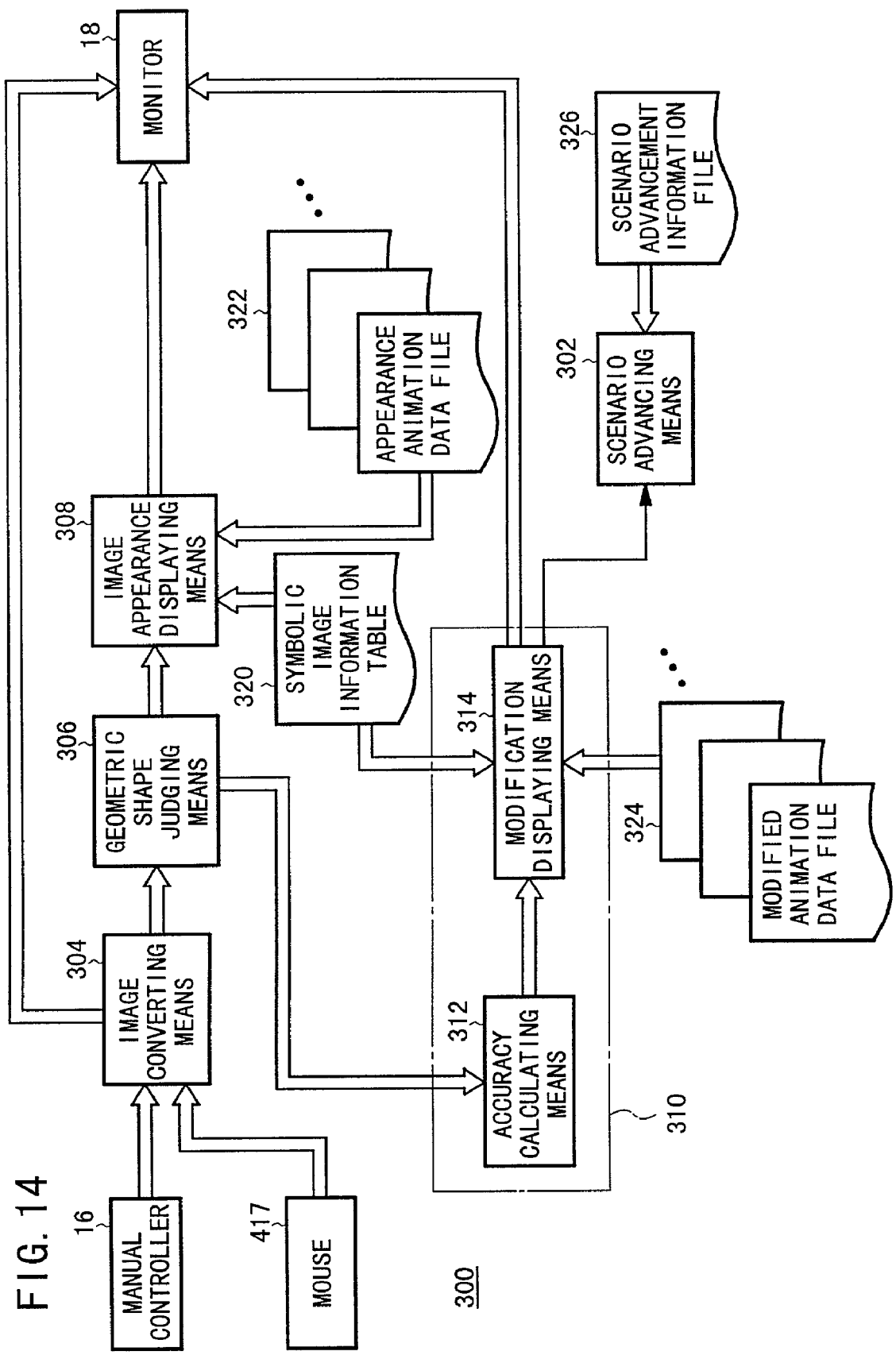

FIG. 17

SYMBOLIC IMAGE INFORMATION TABLE (320)

| COORDINATE INFORMATION | TYPE | SYMBOLIC IMAGE | HEADER ADDRESS | HEADER ADDRESS | | | |
|---|---|---|---|---|---|---|---|
| | | | | LEVEL 1 | LEVEL 2 | LEVEL 3 | LEVEL 4 |
| | STRAIGHT LINE (LONG) | PYRAMID | | | | | |
| | STRAIGHT LINE (LONG) | SPHINX | | | | | |
| | STRAIGHT LINE (SHORT) | OBELISK | | | | | |
| | STRAIGHT LINE (LONG) | CLOUD, POND | | | | | |
| | CIRCLE (SMALL) | OIL | | | | | |
| | CIRCLE (LARGE) | SUN | | | | | |

FIG. 18

SCENARIO ADVANCEMENT INFORMATION FILE (326)

| ORDER | TYPE | DISPLAY AREA | PROGRAM ACTIVATING CONDITIONS | | | | |
|---|---|---|---|---|---|---|---|
| | | | ASSOCIATED SYMBOLIC IMAGE | DISPLAY AREA | NUMBER OF ASSOCIATED IMAGES | COUNTER | PROGRAM NUMBER |
| 1 | CLOUD | | | | | | |
| 2 | POND | | CLOUD | | 2 | 1 | |
| 3 | SUN | | | | | | |
| 4 | OIL | | SUN | | 2 | 1 | |
| 5 | CLOUD | | | | | | |

204a

502

500

204a

502

FIG. 22A
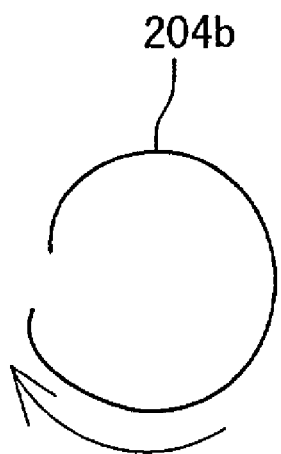
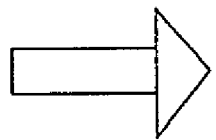
FIG. 22B
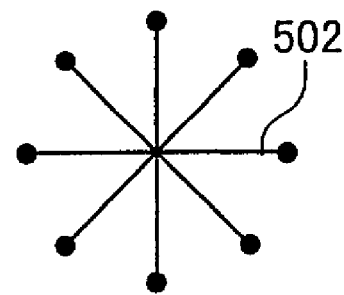

204b

502

ANIMATION DATA FILE(618, 620, 622, 624)

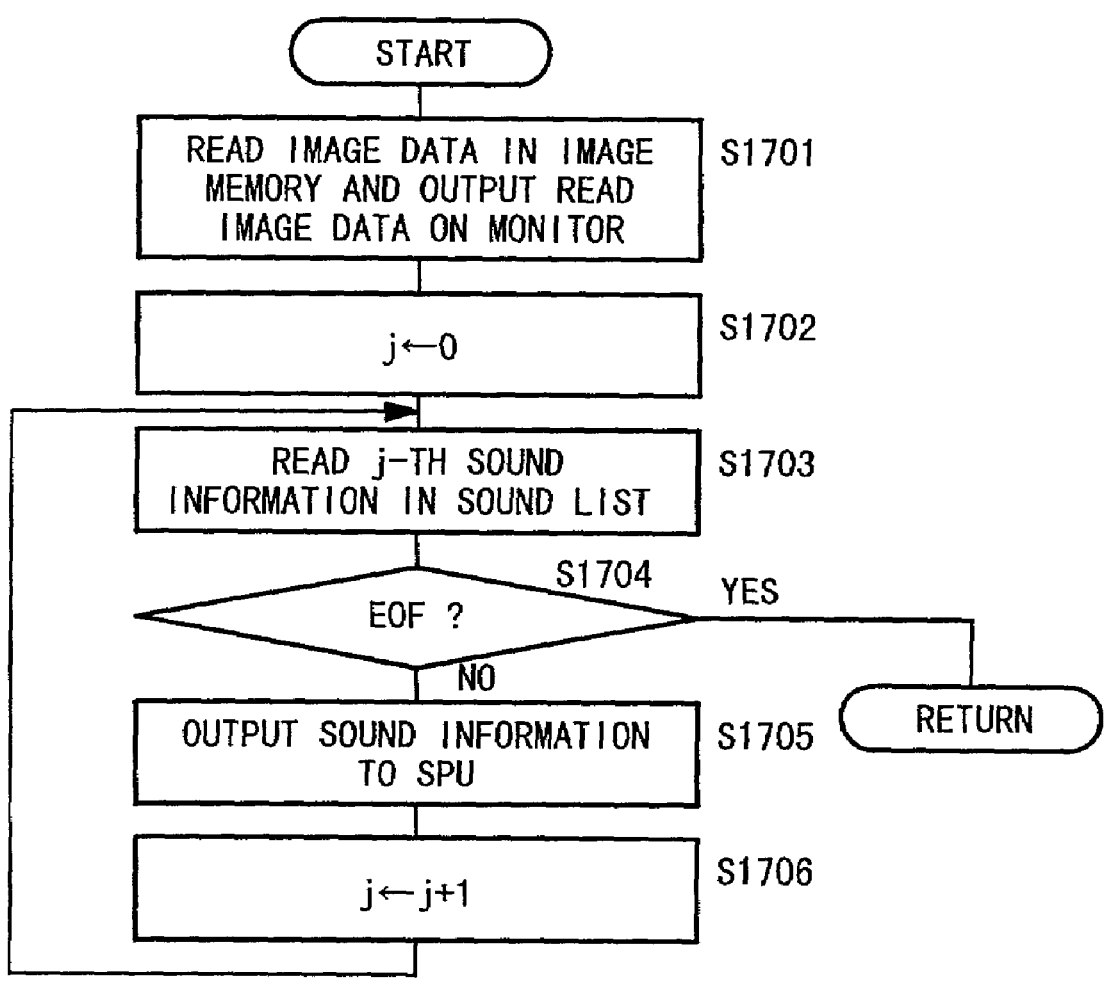

METHOD AND SYSTEM FOR MODIFYING A DISPLAYED SYMBOLIC IMAGE BASED ON THE ACCURACY OF AN INPUT GEOMETRIC SHAPE

BACKGROUND OF THE INVENTION

1. Field of the Invention

The present invention relates to a recording medium for storing a program and data for use of an entertainment system comprising an entertainment apparatus, an input device, and a monitor or the like. The present invention also relates to the program itself, the entertainment system, and the entertainment apparatus. Further, the present invention relates to an image displaying method.

2. Description of the Related Art

Some information processing machines are used for entertaining users. An example of such information processing machines is an entertainment apparatus such as a video game machine. The entertainment apparatus is used in an entertainment system and capable of reproducing game data recorded in a recording medium such as a CD-ROM on the screen of a TV receiver according to data inputted from an input device.

In the entertainment system, the entertainment apparatus and the input device are normally connected to each other by serial interfaces. When a clock signal is sent from the entertainment apparatus to the input device, the input device sends key switch information corresponding to manual input actions of the user in synchronism with the clock signal.

In recent years, the input device is equipped with internal vibration generating means for giving vibrations (shocks) to the user in response to a request from an external drive, for example, the entertainment apparatus. That is, while a game is in progress on the entertainment apparatus, the entertainment apparatus generates various vibrations according to data inputted from the user and give such vibrations to the user.

Further, many types of software such as CAD software and image editing software for assisting the user to draw images on the screen of the monitor with a mouse or a joystick are commercially available.

Mostly, these types of conventional software are not used as entertaining software and simply used for assisting the user to input image data for preparing or editing drawings or documents by manually controlling an input device. Under the circumstances, the inventors of the present invention came up with a novel idea of adding amusing aspects to such software by displaying unintentional images on the screen when geometric shapes are drawn by the user. For example, when the user draws a straight line, an image of a pyramid is displayed on the screen. In this manner, it is possible to create a novel game.

SUMMARY OF THE INVENTION

The present invention has been made under the above circumstances, and an object of which is to provide a recording medium, a program, an entertainment system, an entertainment apparatus, and an image displaying method which are applicable to various video games for displaying unintentional images suddenly based on arbitrary geometric shapes inputted by a user so that an interesting aspect can be added to the inputting operation of geometric shapes.

According to the present invention, a recording medium stores a program and data for use of an entertainment system, the entertainment system comprising:

an entertainment apparatus for executing various programs;

at least one input device for inputting a manual control request of a user to the entertainment apparatus; and a monitor for displaying an image outputted from the entertainment apparatus;

wherein the program comprises the steps of:

selecting a symbolic image from a plurality of symbolic images available for a scene currently displayed on the monitor based on an input geometric shape indicated by an input pattern image drawn according to data inputted by the user with the input device; and displaying the selected symbolic image on the monitor.

Further, according to the present invention, a program is used for an entertainment system comprising:

an entertainment apparatus for executing various programs;

at least one input device for inputting a manual control request of a user to the entertainment apparatus; and a monitor for displaying an image outputted from the entertainment apparatus;

wherein the program comprises the steps of:

selecting a symbolic image from a plurality of symbolic images available for a scene currently displayed on the monitor based on an input geometric shape indicated by an input pattern image drawn according to data inputted by the user with the input device; and displaying the selected symbolic image on the monitor.

Further, according to the present invention, an entertainment system comprises:

an entertainment apparatus having a control unit for executing various programs;

at least one input device for inputting a manual control request of a user to the entertainment apparatus;

a monitor for displaying an image outputted from the entertainment apparatus; and a program executable by the control unit, the program comprising:

means for selecting a symbolic image from a plurality of symbolic images available for a scene currently displayed on the monitor based on an input geometric shape indicated by an input pattern image drawn according to data inputted by the user with the input device; and means for displaying the selected symbolic image on the monitor.

Further, according to the present invention, an entertainment apparatus is connectable to an input device for inputting a manual control request of a user to the entertainment apparatus and connectable to a monitor for displaying an image outputted from the entertainment apparatus, wherein the entertainment apparatus comprises:

means for selecting a symbolic image from a plurality of symbolic images available for a scene currently displayed on the monitor based on an input geometric shape indicated by an input pattern image drawn according to data inputted by the user with the input device; and means for displaying the selected symbolic image on the monitor.

Further, according to the present invention, an image displaying method comprises the steps of:

selecting a symbolic image from a plurality of symbolic images available for a scene currently displayed on the monitor based on an input geometric shape indicated by an input pattern image drawn according to data inputted by the user; and displaying the selected symbolic image on the monitor.

Thus, a plurality of symbolic images are available in a scene displayed on the monitor. The plurality of symbolic images correspond to items of information for respective geometric shapes. When the user draws an input pattern image with the input device, a symbolic image corresponding to an input geometric shape indicated by the input pattern image is displayed on the monitor.

Accordingly, when the user draws a straight line as a geometric shape, for example, a pyramid is displayed on the monitor suddenly and unintentionally. Therefore, it is possible to create a novel game in which an interesting aspect is added to the operation of inputting geometric shapes. The concept of the present invention can be applied to various video games and effectively utilized to prevent the user from losing interest in the video games.

The program may further comprise the step of (means for) controlling the progress of a scenario in a scene currently displayed on the monitor based on the symbolic image. Thus, the progress of the scenario can be controlled variously according to the geometric shapes drawn by the user so that development of the scenario can be made unpredictable for the user. Thus, an interesting aspect can be added to the game.

The step of selecting a symbolic image may comprises the steps of:

converting the data inputted by the user with the input device into an input pattern image; and judging an input geometric shape indicated by the input pattern image based on a plurality of judging criterion.

Likewise, the means for selecting a symbolic image may comprises:

means for converting the data inputted by the user with the input device into an input pattern image; and means for judging an input geometric shape indicated by the input pattern image based on a plurality of judging criterion.

The program may further comprise the step of (means for) determining a form of the selected symbolic image based on accuracy of the input geometric shape. That is, since the user can draw perfect symbolic images and various forms of imperfect symbolic images freely on the screen of the monitor, it is possible to for the user to express his feelings on the monitor variously utilizing various forms of the symbolic images.

The step of determining a form of the selected symbolic image may comprise the steps of:

determining accuracy of the input geometric shape based on a judging criteria used in the step of judging an input geometric shape by calculating the number of deviations from an allowable range of the judging criteria; and modifying a form of the selected symbolic image displayed on the monitor based on accuracy of the input geometric shape.

Likewise, the means for determining a form of the selected symbolic image may comprise:

means for determining accuracy of the input geometric shape based on a judging criteria used by the means for judging an input geometric shape by calculating the number of deviations from an allowable range of the judging criteria; and means for modifying a form of the selected symbolic image displayed on the monitor based on accuracy of the input geometric shape.

The input geometric shape comprises a segment having a starting point and an ending point. A judgment as to whether the input geometric shape is a straight line or not may be performed in the step of judging an input geometric shape (by means for judging an input geometric shape) by determining whether the ending point is within an allowable area or not, the allowable area extending from the starting point and having an acceptable deviation width, or by determining whether the segment is within an allowable area having an acceptable aberration width or not. Alternatively, the judgment as to whether the input geometric shape is a straight line or not may be performed by the combination of the above methods.

Further, a judgment as to whether the input geometric shape is a circle or not may be performed in the step of judging an input geometric shape (by the step of judging an input geometric shape) by determining:

whether the starting point and the ending point are closely positioned or not;

whether a difference in length between sides of an imaginary rectangle circumscribing the input geometric shape is within an allowable range or not;

whether there is a corner in the geometric shape or not; and whether there is a crossing positioned remotely from the starting point and the ending point or not.

Further, according to the present invention, the program may comprise the step of (the entertainment system may comprise means for) displaying an animation of the symbolic image on the monitor such that the symbolic image moves arbitrarily in accordance with background music. Thus, the symbolic image not only simply appears on the screen but also dances in timing with the background image. Accordingly, a further amusing aspect can be added to the video game.

The program may comprise the step of (the entertainment system may comprise means for) setting sounds such that the sounds are outputted synchronously with the movement of the symbolic image. In this case, tones of sounds may be set based on at least the size of the symbolic image and pitches of sounds can be set based on at least the position of said symbolic image. Thus, it is possible for the user to draw geometric shapes and compose a music piece in a video game. Accordingly, the video game can be enjoyed in various ways.

The program may comprise the step of (the entertainment system may comprise means for) setting waves of a basic image displayed on the monitor according to the input geometric shape such that the basic image waves arbitrarily. Thus, an animation of the dancing symbolic image can be made much more interesting. Accordingly, it is possible to provide an interesting video game which can be enjoyed by users of various generations.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 6A is a view showing an image of a pyramid which collapses according to accuracy of an input geometric shape;

FIG. 6B is a view showing an image of a sphinx which collapses according to accuracy of an input geometric shape;

FIG. 6C is a view showing an image of an obelisk which collapses according to accuracy of an input geometric shape;

FIG. 13A shows a scene in which a dinosaur baby comes out of an egg when a circle is drawn;

FIG. 13B is a scene in which a flower is displayed when a straight line is drawn;

FIG. 13C is a scene in which a spider is displayed when a wavy line is drawn;

FIG. 14 is a functional block diagram showing a structure of image processing means and scenario advancing means of the present embodiment;

FIG. 17 is a view showing details of a symbolic image information table;

FIG. 18 is a view showing details of a scenario advancement information file;

FIG. 22A is a view of a circle in which it is assumed that the circle is drawn clockwise;

FIG. 22B is a view of a firework symbolic image in which the firework symbolic image is displayed after a circle image (basic image) is displayed by drawing the circle clockwise;

FIG. 41 is a flowchart showing a processing sequence of the image/sound outputting means.

DESCRIPTION OF THE PREFERRED EMBODIMENTS

Embodiments of the present invention will be described with reference to FIGS. 1 through 41.

Figure 1:
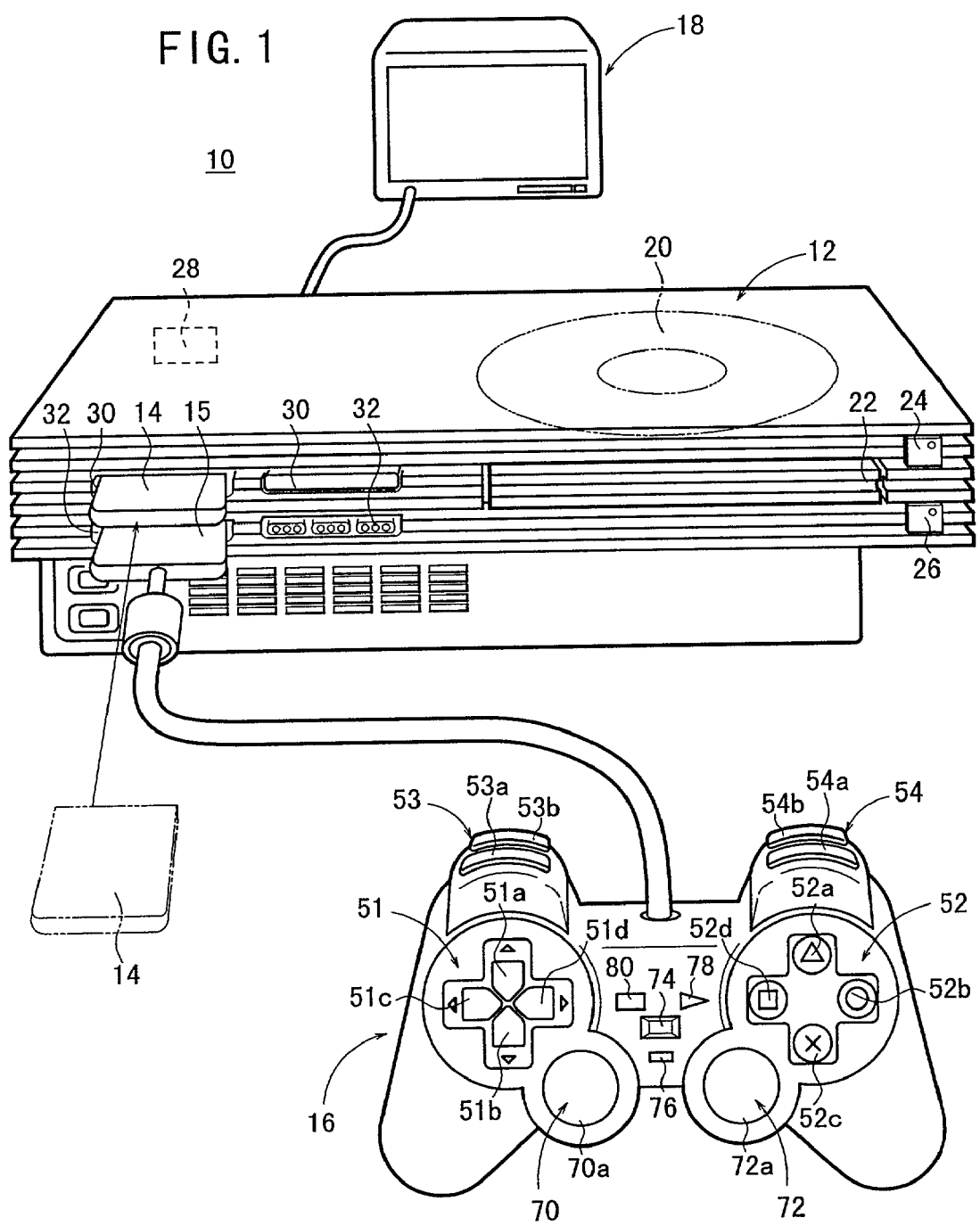
FIG. 1 is a view showing an arrangement of an entertainment system according to an embodiment of the present invention.

FIG. 1 schematically shows in perspective an entertainment system 10 according to an embodiment of the present invention.

As shown in FIG. 1, the entertainment system 10 basically comprises an entertainment apparatus 12 for executing various programs, a memory card 14 detachably connected to the entertainment apparatus 12, a manual controller 16 detachably connected to the entertainment apparatus 12, and a monitor (display) 18 such as a television receiver for displaying video images and outputting audio sounds based on video signals and audio signals supplied from the entertainment apparatus 12.

The entertainment apparatus 12 reads a program recorded in a mass storage medium, i.e., an optical disk 20 such as a CD-ROM or a DVD-ROM, and executes the read program so that a user (game player) can play a game by inputting commands to the entertainment apparatus 12 with the manual controller 16, for example. Specifically, the entertainment apparatus 12 mainly controls the progress of the game by controlling the display of images and the generation of sounds on the monitor 18 based on input commands manually inputted from the manual controller 16 via a connector 15.

The entertainment apparatus 12 has a shape like stacked boxes (upper planar box and lower planar box). On the front side, the entertainment apparatus 12 is equipped with a disk tray 22 movable into and out of the casing as a disk loading unit for installing a recording medium such as the optical disk 20 for storing programs and data, a reset switch 24 for arbitrarily resetting a program which is currently executed, an eject button 26 for opening the disk tray 22, two slots 30 for inserting the memory card 14, and two connection terminals (controller ports) 32 for inserting the connector 15 of the manual controller 16. On the back side, the entertainment apparatus 12 is equipped with a power switch 28, and an unillustrated output terminal (AV MULTI OUT) connectable to an AV cable for outputting images and sounds to the monitor 18 via the AV cable.

The entertainment apparatus 12 has various functions including a control function to read and execute a computer game program (video game program) stored in a recording medium (the optical disk 20) such as a CD-ROM or a DVD-ROM for displaying images, i.e., characters and scenes of the video game on the monitor 18, a control function to play back movie data of DVDs and music data of CDDA (compact disk digital audio), and a control function to execute a program downloaded via a communication link such as a communication network. The entertainment apparatus 12 is capable of executing a game program for generating three-dimensional computer graphics images to be displayed on the monitor 18 as a display.

With the control functions, the entertainment apparatus 12 processes manipulation signals (commands) inputted from the manual controller 16 to reflect such manipulation signals for moving a character or changing a scene on the screen of the monitor 18, for example.

The manual controller 16 has first and second control units 51, 52 disposed in left and right areas on the upper central surface of its casing, third and fourth control units 53, 54 disposed on a side of the casing (where a cord for connection to the entertainment apparatus 12 is connected), and left and right joysticks (analog sticks) 70, 72 disposed in left and right areas on the upper front surface of the casing for inputting commands (signals) depending on the movements (tilting degrees) of the joysticks 70, 72.

The first control unit 51 has four control buttons (also referred to as the "direction buttons"). The direction buttons include an up button 51a, a down button 51b, a left button 51c, and a right button 51d. By pressing the direction buttons 51a, 51b, 51c, 51d, the user (game player) inputs commands for moving a character upwardly, downwardly, leftwardly, and rightwardly displayed on the screen of the monitor 18. The functions (configuration) of the direction buttons are set by a program recorded in the optical disk 20.

The second control unit 52 has four circular control buttons 52a, 52b, 52c, 52d. The control buttons 52a, 52b, 52c, 52d, are marked respectively with symbols of triangle, circle, cross, and square on their upper surfaces and are thus referred to as a triangle button 52a, a circle button 52b, an X button 52c, and a square button 52d.

The functions of the control buttons 52a–52d of the second control unit 52 are set by the program recorded in the optical disk 20. For example, functions to move the left arm, the right arm, the left leg, and the right leg of a character are allocated to the control buttons 52a–52d, respectively.

The third and fourth control units 53, 54 are identical in structure to each other, and have two upper and lower control buttons (L1, L2 buttons) 53a, 53b and two upper and lower control buttons (R1, R2 buttons) 54a, 54b, respectively. Functions of the third and fourth control units 53, 54 are also set by the program recorded in the optical disk 20. For example, a function to perform a special action of a character is allocated.

The left and right joysticks 70, 72 are associated with respective signal input devices such as rheostats which can be rotated 360° about their shafts. Thus, by tilting the shafts of the left joystick 70 and the right joystick 72, command signals having values depending on the tilting movements can be outputted from the manual controller 16. The left and right joysticks 70, 72 return to their neutral positions by resilient members (not shown). In the neutral positions, the left and right joysticks 70, 72 can be pressed downwardly so that signals which are not depending on the tilting movements of the left and right joysticks 70, 72 can be outputted from the manual controller 16. That is, in the neutral positions, the left and right joysticks 70, 72 serve as fifth and sixth control units comprising control buttons (L3, R3 buttons) 70a, 72a, respectively.

When the left and right joysticks 70, 72 are rotated (tilted), command signals are inputted to the entertainment apparatus 12 to cause a character to make an analog action, i.e., to move a character while rotating same, or move a character at a varying speed, or change a status of a character.

In FIG. 1, either the left and right joysticks 70, 72 or the first and second control units 51, 52 are selected by an analog mode switch 74. When the left and right joysticks 70, 72 are selected by the analog mode switch 74, an indicator 76 is turned on, indicating the selection of the left and right joysticks 70, 72.

The manual controller 16 further has a start button (start switch) 78 for instructing the entertainment apparatus 12 to start a game, and a selection button (selection switch) 80 for selecting a level of difficulty of the game before the game is started, for example.

Next, an internal structure of the entertainment system 10 shown in FIG. 1 and its general operation will be described below with reference to a block diagram in FIG. 2.

Figure 2:
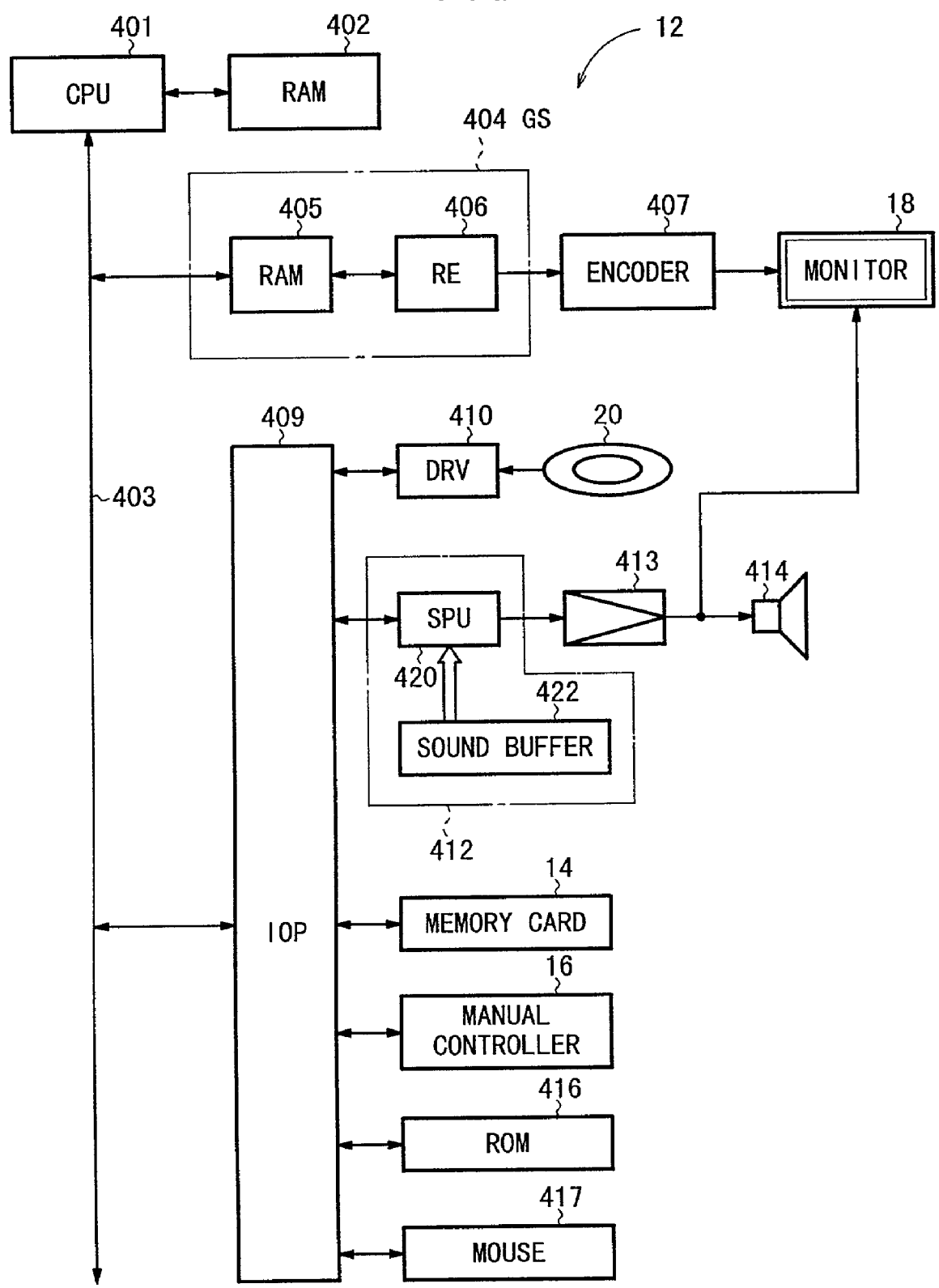
FIG. 2 is a block diagram showing a circuit arrangement of the entertainment system.

As shown in FIG. 2, the entertainment apparatus 12 has a CPU 401 for controlling the entertainment apparatus 12, a RAM (semiconductor memory) 402, and a bus 403. The RAM 402 and the bus 403 are connected to the CPU 401.

Further, the entertainment apparatus 12 has a graphic synthesizer (GS) 404 and an input/output processor (IOP) 409. The GS 404 and the IOP 409 are connected to the CPU 401 via the bus 403. The GS 404 has a RAM 405 including a frame buffer, a z-buffer, and a texture memory, and also has a rendering engine (RE) 406 having a rendering function to draw (render and store) images in the frame buffer of the RAM 405.

The monitor 18 as an external device is connected to the GS 404 via an encoder 407 for converting digital RGB signals into standard TV signals in NTSC format, for example.

IOP 409 is connected to an optical disk drive (DRV) 410 for reading and decoding data recorded in the optical disk 20, a sound generating system 412, the memory card 14 as an external memory comprising a flash memory, the manual controller 16, a mouse 417, and a ROM 416 for storing an operating system or the like. The sound generating system 412 supplies audio signals to the speaker 414 as an external device and/or the monitor 18 connected to the sound generating system 412 via the amplifier 413.

The sound generating system 412 comprises a sound processing unit (SPU) 420 for generating music sounds, sound effects, etc. based on instructions from the CPU 401, and a sound buffer 422 for storing music sounds, sound effects, etc. generated by the SPU 420. Audio signals representing music sounds, sound effects, etc. generated by the SPU 420 are supplied to audio terminals of the speaker 414 and/or the monitor 18. The speaker 414 and/or the monitor 18 output music sounds, sound effects, etc. generated by the SPU 420 based on the supplied audio signals.

The SPU 420 has an ADPCM (adaptive differential PCM) function for reproducing 16-bit sound data which has been encoded as 4-bit differential sound data by ADPCM, a reproducing function for reproducing waveform data stored in the sound buffer 422 to generate sound effects, etc., and a modulating function for modulating and reproducing the waveform data stored in the sound buffer 422.

The sound generating system 412 with these functions can be used as a sampling sound source which generates music sounds, sound effects, etc. based on the waveform data stored in the sound buffer 422 according to instructions from the CPU 401.

The memory card 14 is an external storage device comprising a CPU or a gate array, and a flash memory. The memory card 14 is detachably connectable to the slot 30 of the entertainment apparatus 12 as shown in FIG. 1. The memory card 14 is used for storing (saving) interim game data and a program such as a DVD player program (DVD driver).

The manual controller 16 supplies commands (binary, two-valued commands and multi-valued commands) input-ted by a user to the entertainment apparatus 12 when the user presses the control buttons of the manual controller 16. The DRV 410 has a decoder for decoding images encoded in the standard MPEG (moving picture experts group) format.

Next, the mechanism of displaying an image on the monitor 18 according to commands from the manual controller 16 will be described. It is assumed that object data such as polygon vertex data and texture data are recorded in the optical disk 20. These data are read from the optical disk 20 by the DRV 410, stored in the RAM 402, and processed by the CPU 401.

When an instruction from a user (player) is inputted to the entertainment apparatus 12 via the manual controller 16, the CPU 401 calculates three-dimensional positions (coordinates) of objects and directions of the objects toward a viewpoint based on the instruction. Thus, the polygon vertex data of objects can be defined by coordinate data, i.e., converted into coordinate data of the three orthogonal axes (X, Y, and Z axes), and then, converted into two-dimensional coordinate data by perspective transformation.

In this manner, polygons can be defined by such two-dimensional coordinate data. The converted two-dimensional coordinate data, z data, and texture data are supplied to the GS 404. Then, the GS 404 performs rendering based on the converted two-dimensional data, z data to successively generate images as image data to be drawn (stored) in a memory, i.e., the RAM 405 (frame buffer). The image data for one frame generated in the rendering process is encoded by the encoder 407, supplied to the monitor 18, and displayed on the screen of the monitor 18 as an image.

Next, two characteristic functions of the entertainment system 10 according to the present embodiment will be described with reference to FIGS. 3 through FIG. 13C. The characteristic functions can be achieved by executing a program supplied by a randomly accessible recording medium such as the optical disk 20 or the memory card 14, or supplied through a network.

A first characteristic function is to selectively display a symbolic image on the screen of the monitor 18. The symbolic image is selected from a plurality of symbolic images available in the current scene according to an input geometric shape indicated by an input pattern image drawn based on data inputted from a manual input device such as the manual controller 16 or the mouse 417.

A second characteristic function is to control the progress of a scenario in a scene currently displayed on the monitor 18 based on the symbolic image.

The input pattern image is drawn based on input signals from the manual controller 16, i.e., input values obtained by manipulating the left or right joystick 70, 72. Alternatively, the control buttons of the manual controller 16 other than the left and right joysticks 70, 72 may be used to draw the input pattern image. Further, other coordinate input devices such as the mouse 407 connected to the IOP 409 (see FIG. 2) may be used to draw the input pattern image.

Figure 3:
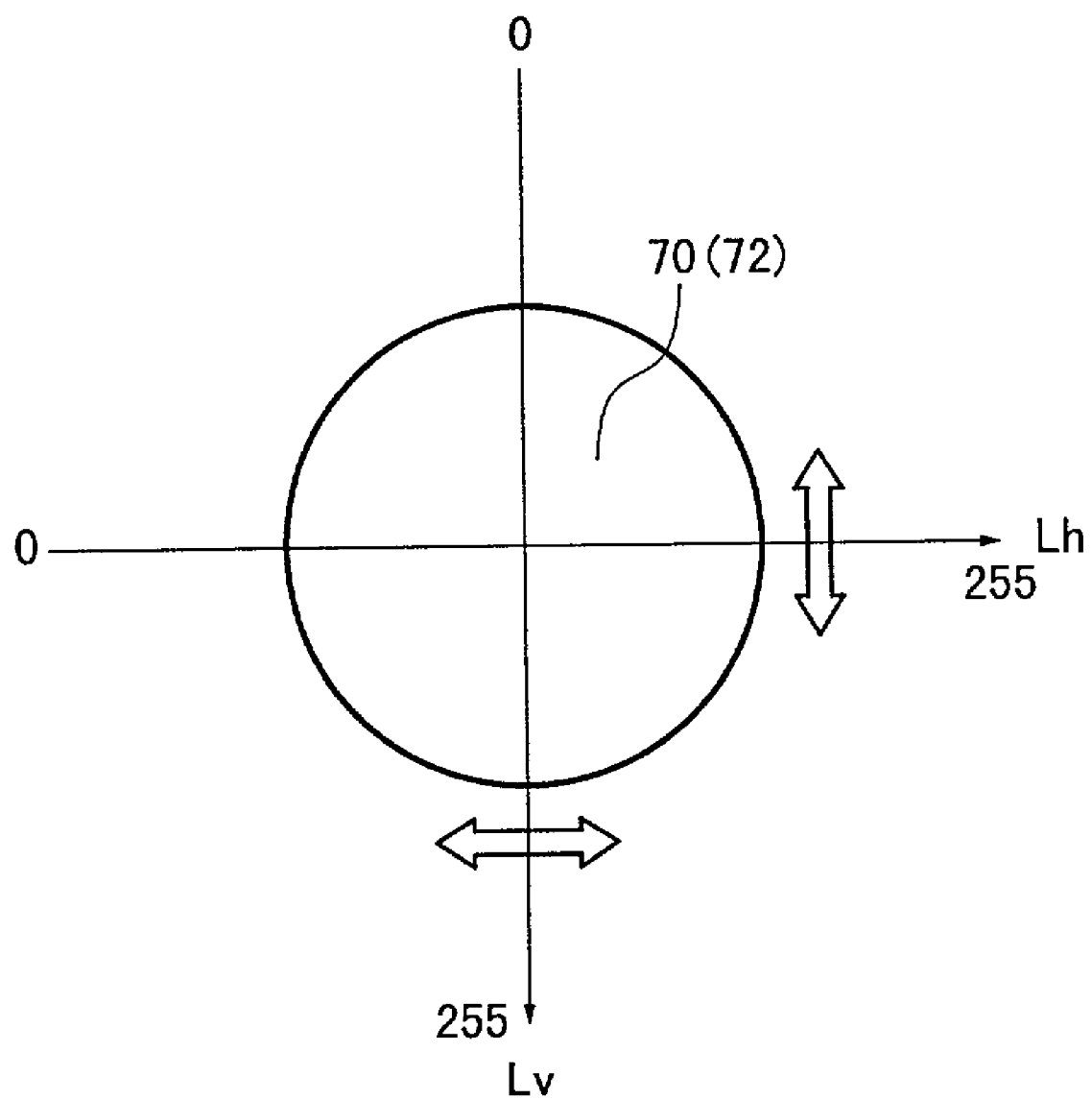
FIG. 3 is a view showing a relationship between a vertical value and a left or right joystick, and a relationship between a horizontal value and the left or right joystick.

The values of the input signals obtained by manipulating the left or right joystick 70, 72 are determined by positions of the left or right joysticks 70, 72. In FIG. 3, the relationship between the positions of the left joystick 70 or the right joystick 72 and the values of the input signals are shown. It is to be understood that one input signal has two directional values, i.e., the value in the vertical direction (vertical value Lv), and the value in the horizontal direction (horizontal value Lh) depending on the vertical position and the horizontal position of the joystick. The vertical value Lv is in the range of "0" through "255" from the upper end position to the lower end position. Similarly, the horizontal value Lh is in the range of "0" through "255" from the left end position to the right end position. Further, the degree of leaning (tilt) L can be calculated by the following expression.

$$L=\sqrt{\{(Lv)^2+(Lh)^2\}}$$

The left or right joystick 70, 72 can be used like the mouse 417. In this case, the left or right joystick 70, 72 is pressed downwardly to function as the control button (L3 button) 70a or the control button (R3 button) 72a, and tilted to generate input values. Specifically, a starting point is designated by pressing the left or right joystick 70, 72 initially. Then, the left or right joystick 70, 72 is tilted to generate input values corresponding to the tilting degree. Then, an ending point is designated when pressing of the left or right joystick 70, 72 is finally stopped. In this manner, it is possible to manipulate the left joystick 70 or the right joystick 72 to perform a function similar to the drag function of the mouse 417.

Figure 4:
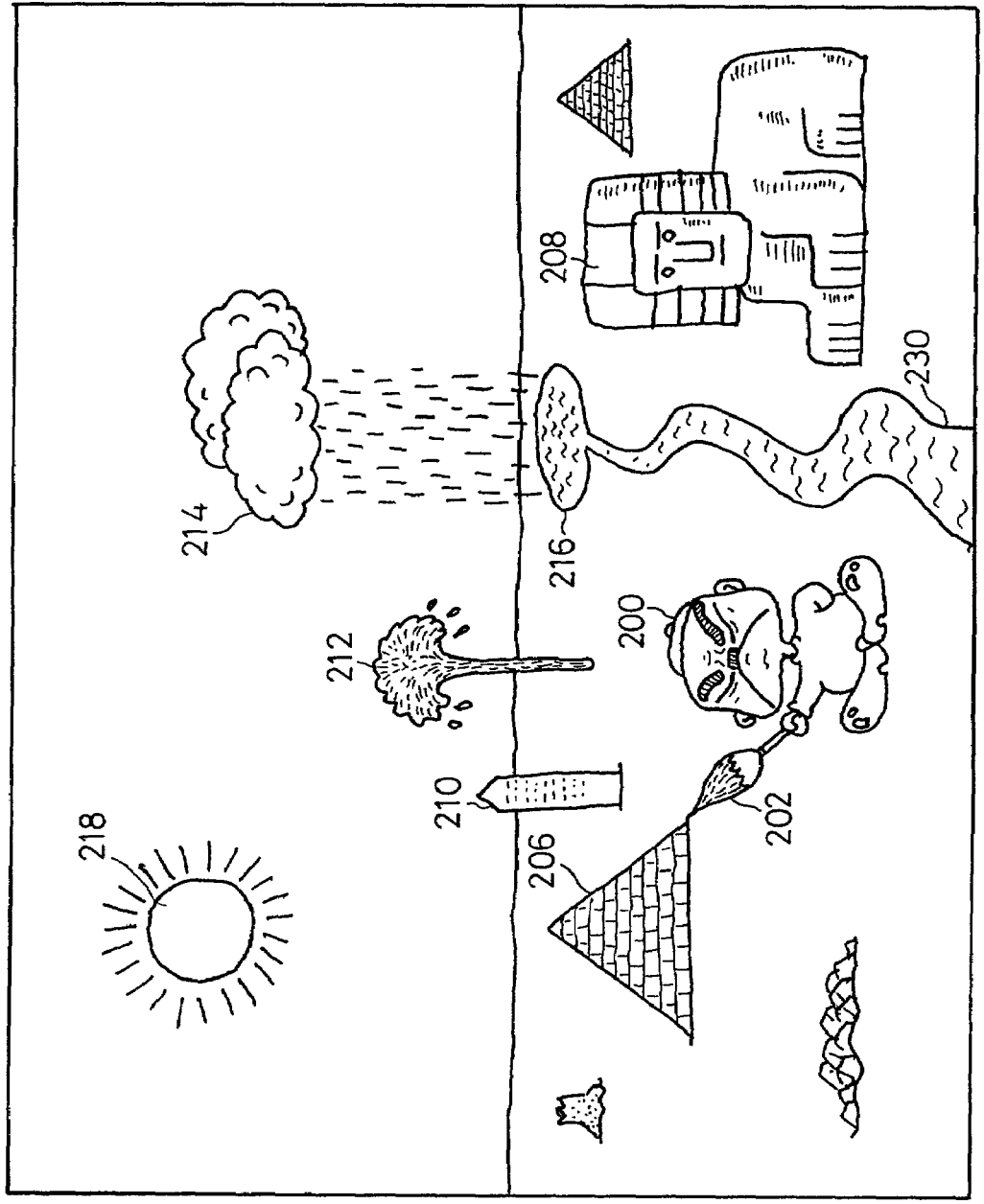
FIG. 4 is a view showing a scene in a dessert in which an image of a pyramid is displayed.
Figure 5A:
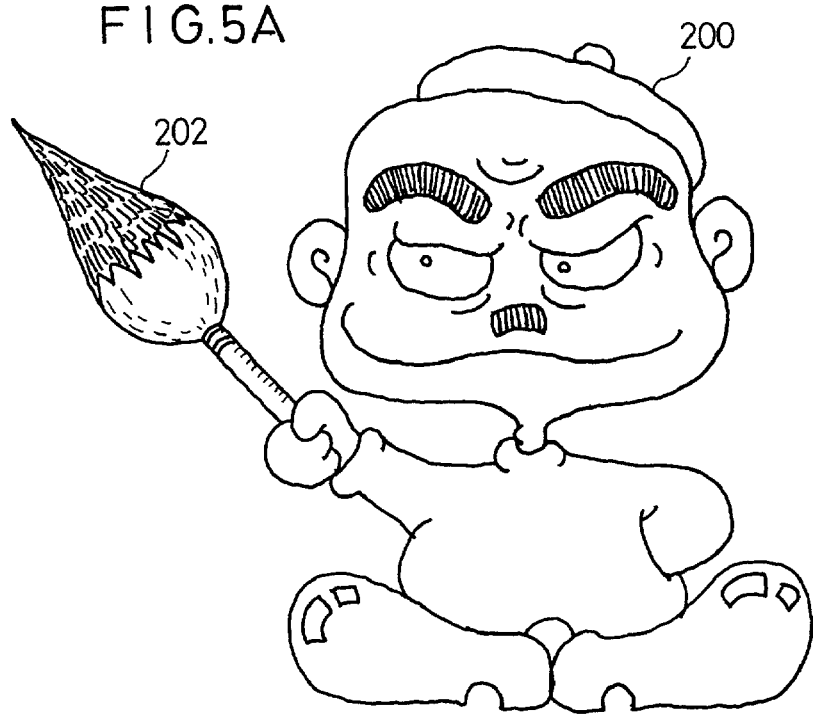
FIG. 5A is a view as an example of a character moving in accordance with data inputted by a user.
Figure 5B:
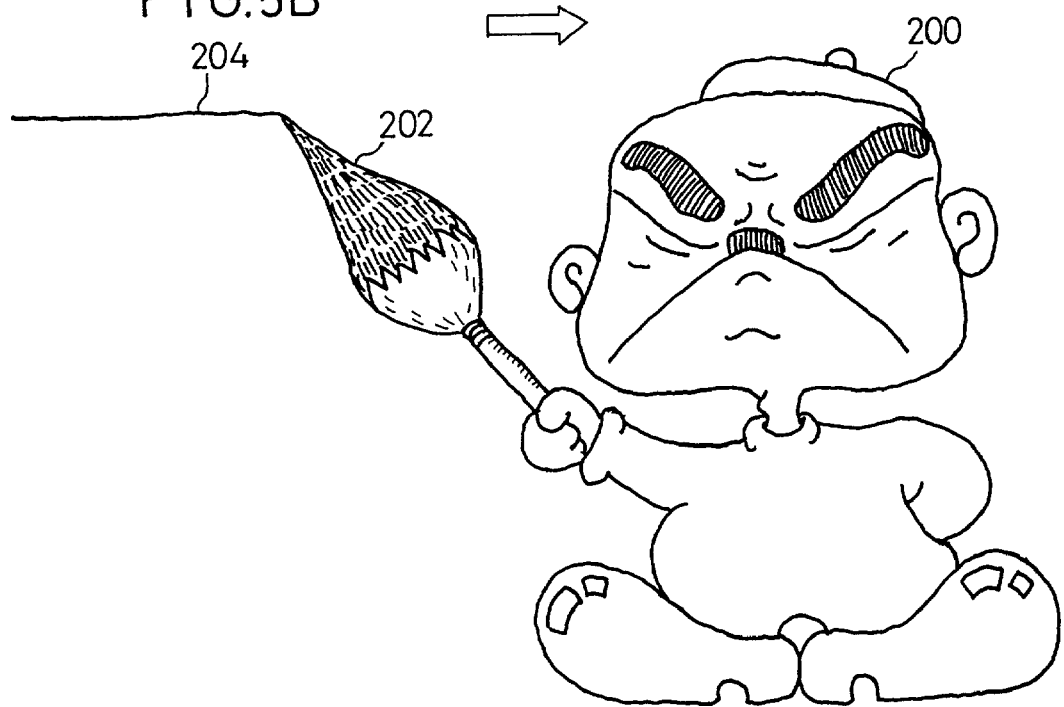
FIG. 5B is a view showing a straight line drawn by moving the character in one direction.

A specific example of the first function is shown in FIG. 4. In a scene of a desert, a character 200 is displayed. The character 200 moves according to manipulation data inputted by a user. As shown in FIG. 5A, the character 200 has a writing brush 202. The writing brush 202 moves together with the character 200 according to manipulation data inputted by the user for drawing a geometric shape 204. Preferably, the moving character 200 has a serious look on his face to give an interesting impression to the user that the character 200 is doing his best. In FIG. 5B, the character 200 is making a grimace while drawing the geometric shape 204.

Further, as shown in FIG. 4, by drawing various geometric shapes at arbitrary positions, symbolic images such as a pyramid 206 and a sphinx 208 corresponding to the geometric shapes are displayed at positions corresponding to the positions of the geometric shapes.

In the example of FIG. 4, the pyramid 206 and the sphinx 208 are randomly displayed by drawing relatively long straight lines in the desert. An obelisk 210 is displayed by drawing a relatively short straight line in the desert. A gushing oil 212 is displayed by drawing a small circle in the desert.

Further, in FIG. 4, a rain cloud 214 and a pond 216 are displayed by drawing a relatively long straight line in the sky. The sun 218 is displayed by drawing a relatively large circle in the sky.

According to the first function, a form of the symbolic image to be displayed on the monitor 18 is determined based on the quality (accuracy) of the geometric shape drawn by the user. For example, if a straight line drawn in the dessert is equal to a predetermined straight line or within an allowable range (substantially equal to the predetermined straight line), a symbolic image such as the pyramid 206, the sphinx 208, or the obelisk 210 is displayed as a perfect image. However, if a straight line substantially deviated from a predetermined line, i.e., deviated from an allowable range is drawn, a symbolic image such as the pyramid 206, the sphinx 208, or the obelisk 210 is displayed as a collapsed image as shown in FIGS. 6A, 6B, 6C.

Next, methods of judging the type and accuracy of a geometric shape drawn by the user will be described with reference to FIGS. 7A through 10B.

Basically, it is difficult for the user to draw a precise geometric shape such as a straight line or a circle manually by directly manipulating an input device such as the manual controller 16 or the mouse 417. Therefore, judging criterion having certain tolerances for accepting erroneous inputs are preset for respective types of the geometric shapes. The type of a geometric shape drawn by the user can be determined based on the respective judging criterion.

Figure 7A:
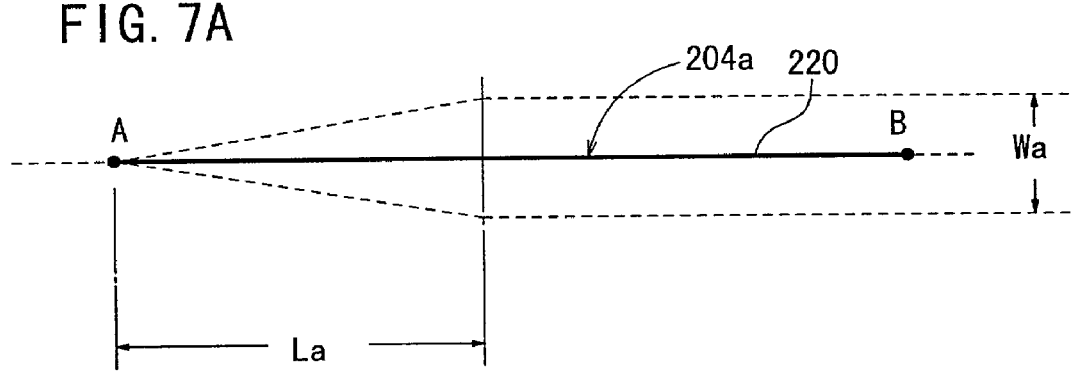
FIG. 7A is a first judging method for a straight line.

FIG. 7A shows a first method of judging whether a segment 220 having a starting point A and an ending point B is a straight line 204a or not (The segment 220 is an input geometric shape drawn by the user with the input device). Specifically, the first method is to determine whether the ending point B of the segment 220 is within an allowable range, i.e., within an acceptable deviation width Wa or not. The acceptable deviation width Wa is indicated by dotted lines horizontally extending from the starting point A.

When a straight line 204a is to be drawn in the horizontal direction, the starting point A and the ending point B should have the same coordinate value in the vertical direction. However, the position of the ending point B tends to be deviated when the user draws the segment 220 manually. Therefore, the acceptable deviation width Wa is used as a tolerance to accept a certain degree of the deviation.

The acceptable deviation width Wa is increased gradually in proportion to length of the segment 220 extending from the starting point A. When the length of the segment 220 reaches a certain limited length, i.e., the segment 220 is drawn for a tolerance adding distance La, the acceptable deviation width Wa reaches its maximum width. In FIG. 7A, the acceptable deviation width Wa is exaggerated to some extent for the purpose of brevity.

If the ending point B is positioned within the acceptable deviation width Wa, the segment 220 is judged as a straight line 204a regardless of curving of the segment 220. The above method can be also used when a straight line 204a is to be drawn in the vertical direction.

Figure 7B:
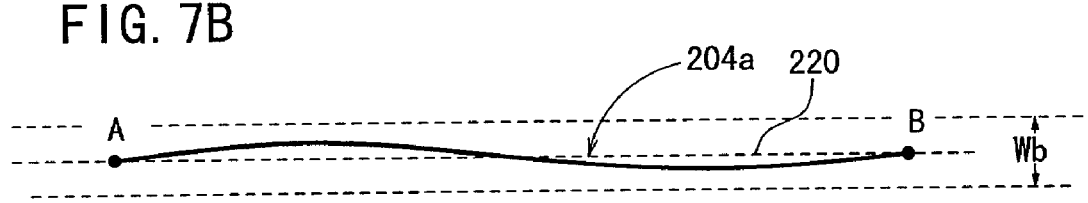
FIG. 7B is a second judging method for a straight line.

FIG. 7B shows a second method of judging whether a segment 220 having a starting point A and an ending point B is a straight line 204a or not. Specifically, the second method is to determine whether the segment 220 is within an allowable range, i.e., within an acceptable aberration width Wb or not.

A value of the acceptable aberration width Wb is preset as shown in FIG. 7B. If the segment 220 is positioned within the acceptable aberration width Wb, the segment 220 is judged as a straight line 204a regardless of curving of the segment 220. The second method is not limited to judgment of a horizontal straight line 204a or a vertical straight line 204a. The second method can be used for judgment of a straight line 204a in any direction. That is, as long as the segment 220 is within the acceptable aberration width Wb, the segment 220 is judged as a straight line 204a regardless of the coordinate value of the ending point B.

Figure 7C:
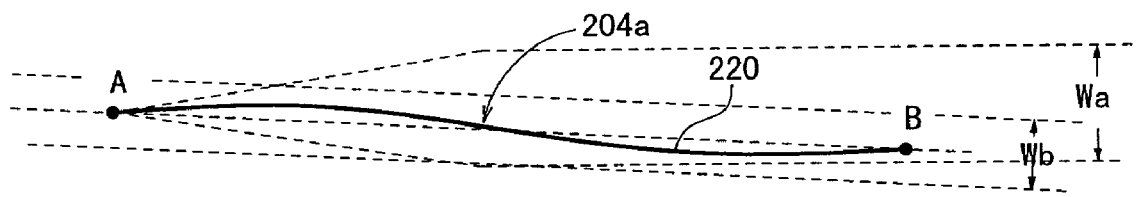
FIG. 7C is a third judging method for a straight line.

FIG. 7C shows a third method of judging whether a segment 220 having a starting point A and an ending point B is a straight line 204a or not. The third method is a combination of the first method and the second method. When the segment 220 is drawn in the horizontal direction, if the ending point B of the segment 220 is positioned within the acceptable deviation width Wa, and the segment 220 is positioned within the acceptable aberration width Wb, the segment 220 is judged as a straight line 204a. In this manner, the third method is used for more accurately judging whether the segment 220 is a straight line 204a or not.

Though, there are no specific rules or limitations for setting values of the acceptable deviation width Wa, the acceptable aberration width Wb, and the tolerance adding distance La in the above judging methods, it is possible to appropriately set these values depending on the scene displayed on the monitor 18 or depending on the input sensitivity in manipulating the joystick 70, 72, or the mouse 417.

Next, a method of judging whether a segment 220 having a starting point A and an ending point B is a circle 204b or not will be described. The judgment can be made by using criterion (1) whether the starting point A and the ending point B are closely positioned or not (see FIGS. 8A through 9B), (2) whether a difference in length between sides of an imaginary rectangle circumscribing a geometric shape 222 is within an allowable error range or not (see FIGS. 10A and 10B), (3) whether there is a corner in the geometric shape 222 or not, and (4) whether there is a crossing positioned remotely from the starting point A and the ending point B. That is, when all the criterion (1) through (4) are satisfied, the segment 220 is judged as a circle 204b.

Figure 8A:
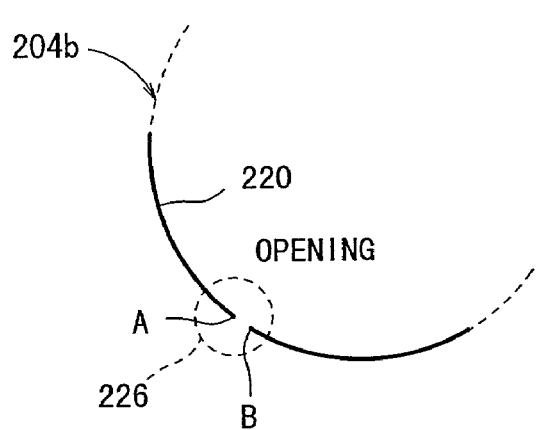
FIG. 8A is a view showing a starting point and an ending point in which the starting point and the ending point are spaced from each other and the ending point is positioned within an allowable range.
Figure 8B:
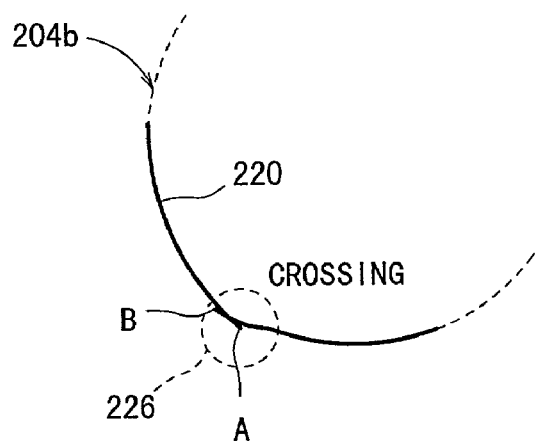
FIG. 8B is a view showing a starting point and an ending point in which a crossing is made between the starting point and the ending point and the ending point is positioned within an allowable range.

According to the criteria (1), the starting point A and the ending point B should be the same point. However, it is difficult for the user to manually draw the segment 220 accurately such that the starting point A and the ending point are positioned at the same point. Therefore, if the ending point B is positioned within an allowable range, i.e., within a small circle 226 around the starting point A, the segment 220 is judged as a circle 204b. That is, an opening between the starting point A and the ending point B shown in FIG. 8A, and a crossing near the starting point A and the ending point B shown in FIG. 8B are acceptable.

Figure 9A:
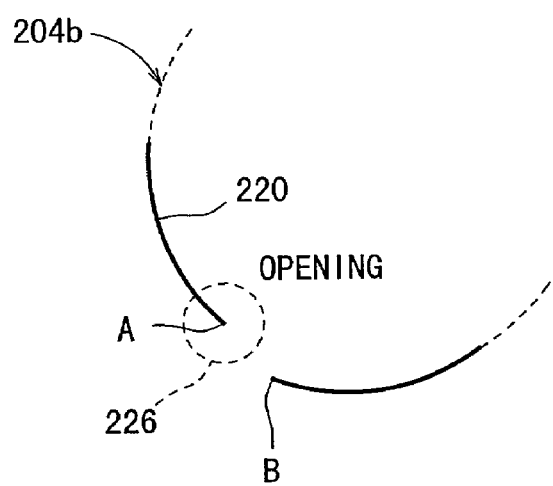
FIG. 9A is a view showing a starting point and an ending point in which in which the starting point and the ending point are spaced from each other and the ending point is deviated from an allowable range.
Figure 9B:
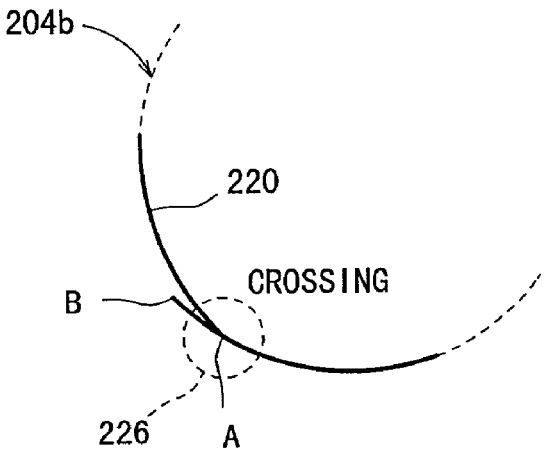
FIG. 9B is a view showing a starting point and an ending point in which a crossing is made between the starting point and the ending point and the ending point is deviated from an allowable range.

In contrast, if the ending point B is not positioned within the small circle 226 around the starting point A, the segment 220 is not judged as a circle 204b. That is, an opening between the starting point A and the ending point B shown in FIG. 9A and a crossing near the ending point B shown in FIG. 9B are not acceptable.

Figure 10A:
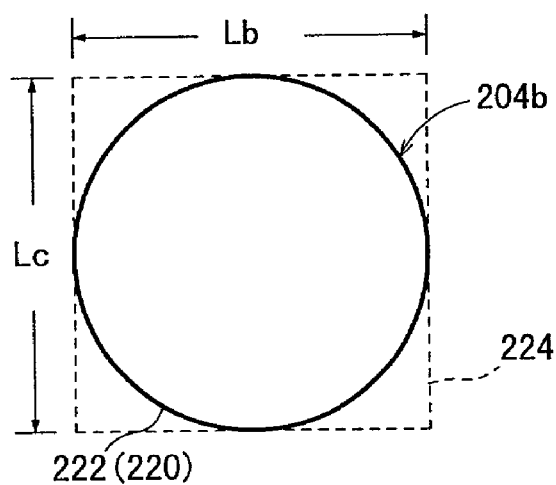
FIG. 10A is a view showing an imaginary rectangle circumscribing an input geometric shape.
Figure 10B:
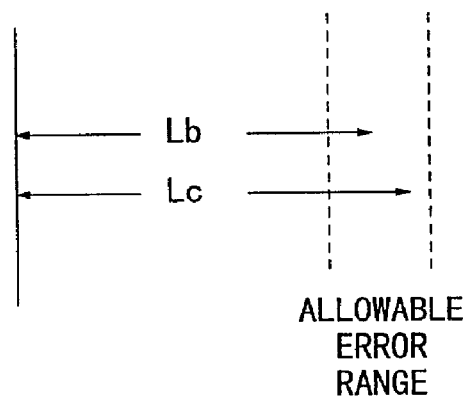
FIG. 10B is a view showing a comparison of sides of the imaginary rectangle.

According to the criteria (2), a size of a circle 204b is defined, for example. If respective horizontal length Lb and vertical length Lc of an imaginary rectangle 224 circumscribing a geometric shape 222 (the segment 220 having the starting point A and the ending point B) in FIG. 10A are longer than a predetermined length and a difference between the horizontal length Lb and the vertical length Lc is within an allowable range as shown in FIG. 10B, the segment 220 is judged as a circle 204b.

According to the criteria (3), if the geometric shape 222 (segment 220) is constituted by only curves and short lines, the segment 220 is judged as a circle 204b.

It is also possible to judge other types of geometric shapes easily by appropriately combining the respective judging methods for the straight line 204a and the judging method for the circle 204b. For example, judgment for a square can be made by using the judging methods for the straight line 204a, and judgment for an ellipse can be made by modifying the criteria (2) of the judging method for the circle 204b.

Figure 11A:
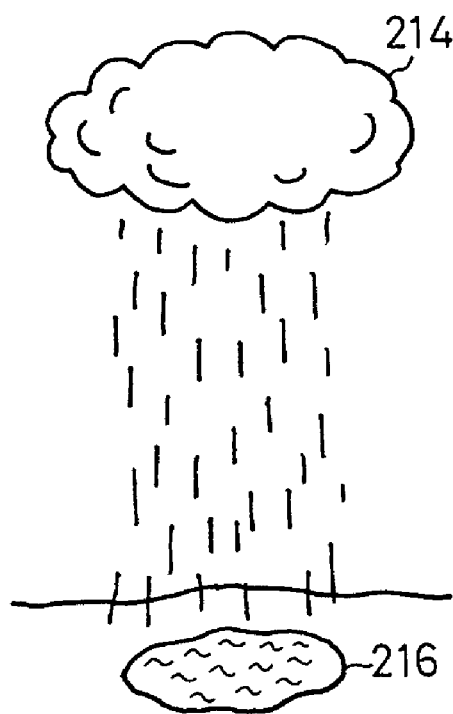
FIG. 11A shows a scene in which a rain cloud and a pond are displayed when a straight line is drawn in the sky.
Figure 11B:
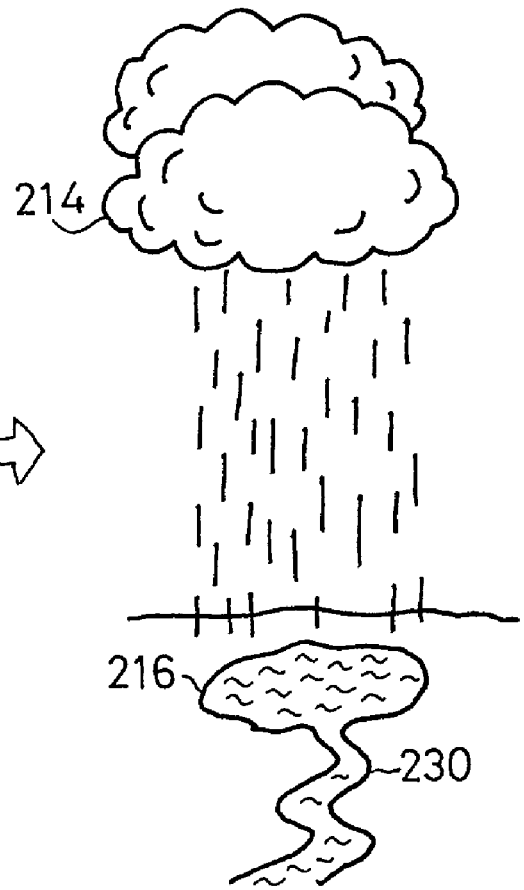
FIG. 11B shows a scene in which a river is flowing from the pond.

Next, the second function of the present embodiment will be explained hereinbelow. When a straight line 204a is drawn in the sky, a rain cloud 214 and a pond 216 are displayed successively on the screen as shown in FIG. 11A. Then, after a while, a river 230 flowing from the pond 216 is displayed. When two or more straight lines 204a are drawn in the sky, the rain clouds 214 and the pond 216, and the river 230 are displayed successively as shown in FIG. 11B. That is, an advancement of a scenario is made on the screen.

Figure 12A:
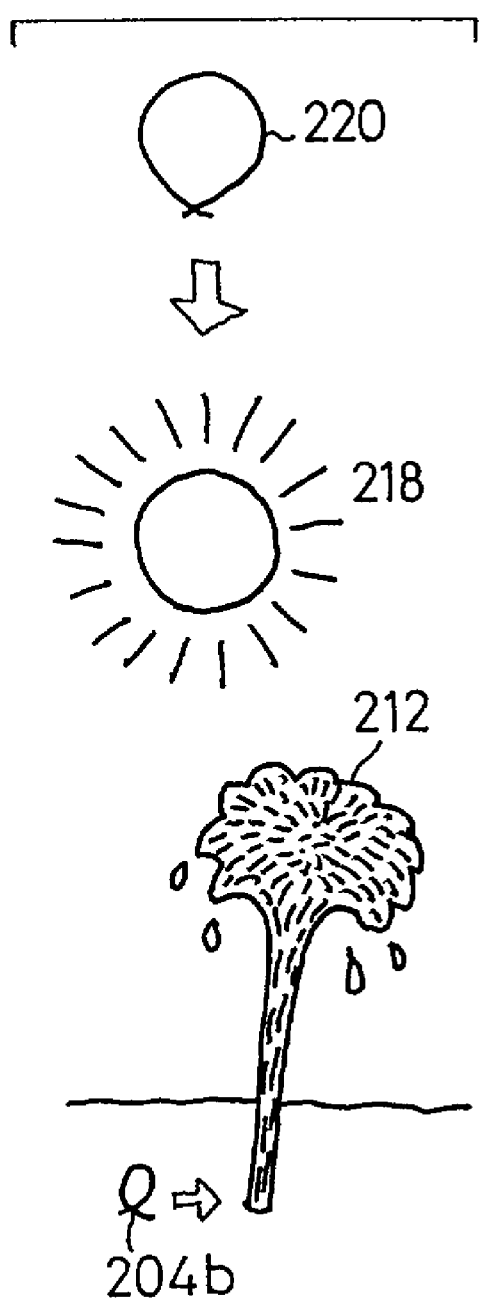
FIG. 12A shows a scene in which a gushing oil is displayed when a small circle is drawn in the desert and the sun is displayed when a circle is drawn in the sky.
Figure 12B:
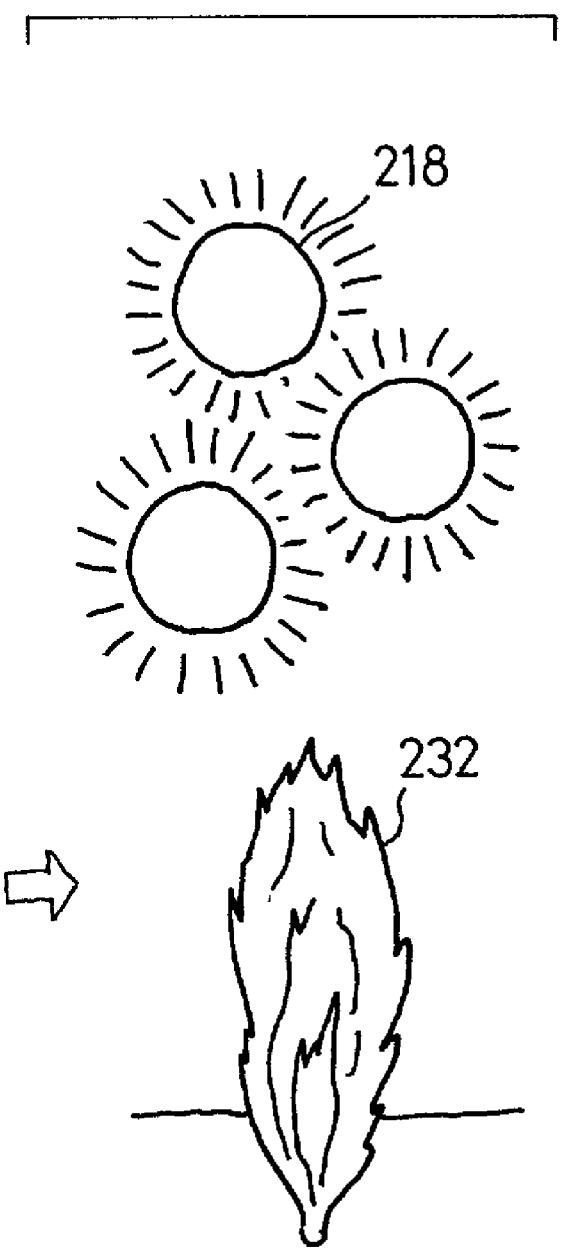
FIG. 12B shows a scene in which the gushing oil changes into a burning oil.

When a small circle 204b is drawn in the desert and a circle 204b is drawn in the sky, a gushing oil 212 and the sun 218 is displayed on the screen as shown in FIG. 12A. When a plurality of circles 204b are drawn in the sky to increase the number of the suns 218, the gushing oil 212 changes into a burning oil 232. That is, an advancement of a scenario is made by displaying a scene in which the gushing oil 218 catches fire under the heat of the suns and starts burning as the burning oil 232.

In the above example, scenes in an ancient desert were described. However, the present invention is applicable to various scenes. As another example, in a scene of a jungle in the age of dinosaurs, a dinosaur baby 234 coming out of an egg can be displayed by drawing a circle 204b as shown in FIG. 13A, an intimidating flower monster 236 can be displayed by drawing a straight line 204a as shown in FIG. 13B, and a giant spider 238 can be displayed by drawing a wavy line 204c. In this manner, it is possible to display various images on the screen.

Next, an example of software (image processing means 300 and scenario advancing means 302) for carrying out the above first and second functions will be described with reference to FIGS. 14 through 19.

As described above, the image processing means 300 and the scenario advancing means 302 are supplied by a randomly accessible recording medium such as the optical disk 20 or the memory card 14, or supplied through a network. In the following description, it is assumed that the image processing means 300 and the scenario processing means 302 are read from the optical disk 20 and executed by the entertainment apparatus 12.

Specifically, as shown in FIG. 2, a certain optical disk 20 is played back by the entertainment apparatus to read the image processing means 300 and the scenario advancing means 302. The image processing means 300 and the scenario advancing means 302 read from the optical disk 20 is stored in the RAM 402 of the entertainment apparatus 12 by a predetermined process and executed by the CPU 401.

As shown in FIG. 14, the image processing means 300 comprises image converting means 304 for converting manipulation data inputted form the mouse 417 or the manual controller 16 into an input pattern image, geometric shape judging means 306 for determining a type of an input geometric shape indicated by the input pattern image based on a plurality of geometric shape judging criterion, image appearance displaying means 308 for displaying a symbolic image corresponding to the type of the input geometric shape on the screen of the monitor 18, and image form determining means 310 for determining a form (shape) of the symbolic image displayed on the monitor 18.

The image form determining means 310 comprises accuracy calculating means 312 for determining accuracy of the input geometric shape based on the number of deviations from an allowable range of a geometric shape judging criteria used in judgment for the determined type of the input geometric shape, and modification displaying means 314 for modifying the form of the symbolic image displayed on the screen of the monitor 18 based on the accuracy of the input geometric shape.

Next, operations of the image processing means 300 and the scenario advancing means 302 will be described with reference to FIGS. 15 through 19.

Figure 15:
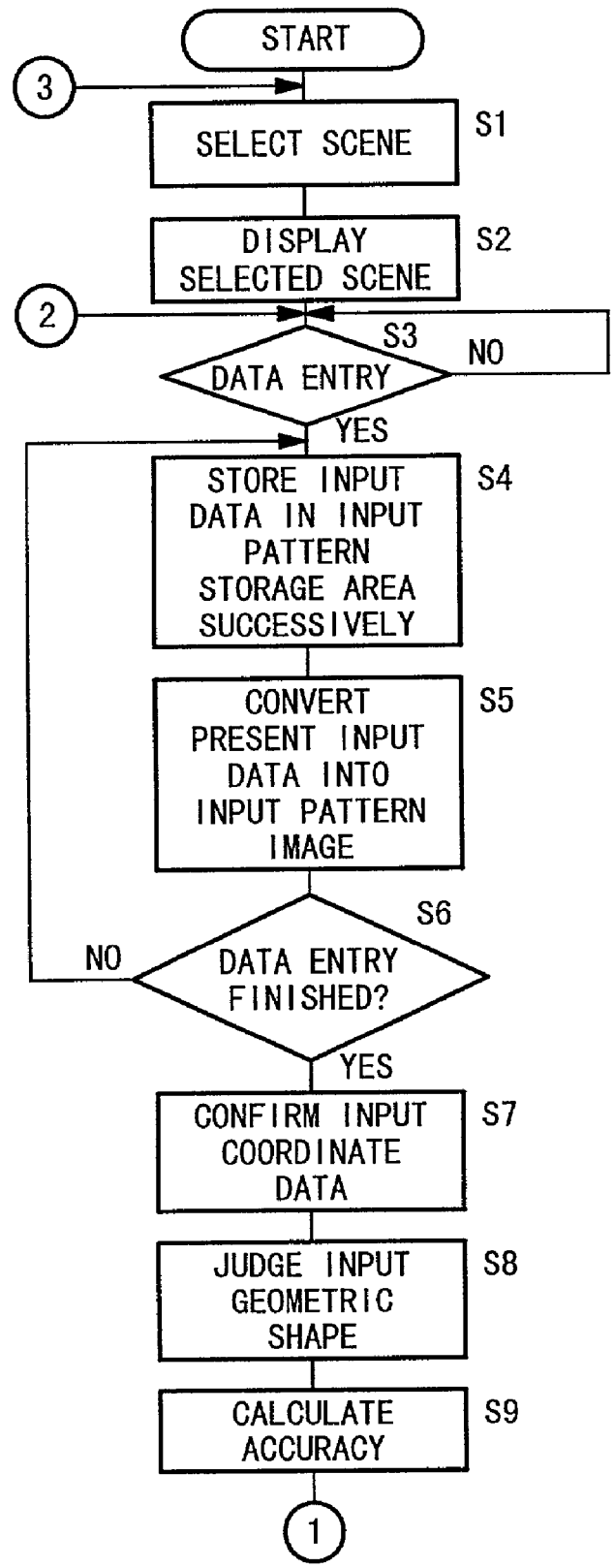
FIG. 15 is a flowchart (No. 1) showing a processing sequence of the image processing means of the present embodiment.
Figure 16:
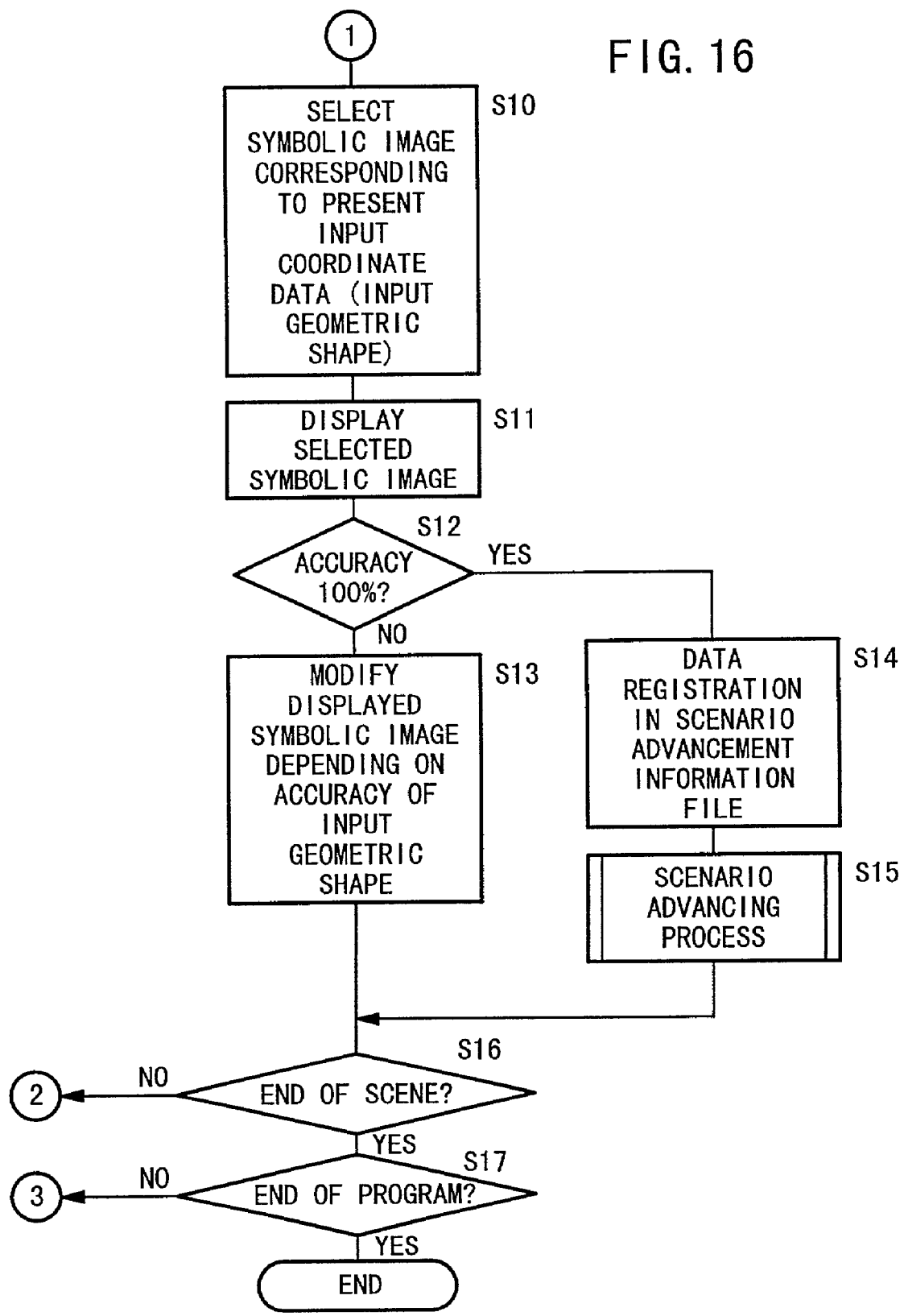
FIG. 16 is a flowchart (No. 2) showing a processing sequence of the image processing means of the present embodiment.

In FIGS. 15 and 16, a processing sequence of the image processing means 300 is shown. In step S1 of FIG. 15, a scene is selected. Specifically, the user inputs a command to select a scene on the menu screen with an input device.

When a scene is selected, control passes to step S2 for displaying the selected scene on the screen of the monitor 18. Then, in step S3, the image processing means 300 waits for a data entry from the user, i.e., from the input device such as the mouse 417 or the left or right joystick 70, 72.

When a data entry from the user is started, control passes to step S4. In step S4, the image converting means 304 stores the input data (coordinate data, etc.) from the mouse 417 or the left or right joystick 70, 72 in a predetermined storage area (input pattern storage area) successively. Then, in step S5, the input data stored in the input pattern storage area is converted into an input pattern image and displayed on the screen of the monitor 18.

Next, in step S6, it is determined whether the data entry from the mouse 417 or the left or right joystick 70, 72 is finished or not. Specifically, it is determined whether the coordinate data entry from the mouse 417 is finished or not, or whether the pressing of the control button 70a of the left joystick 70 or the control button 72a of the right joystick 72 is finished or not.

When the data entry is not finished, control passes back to step S4 and the subsequent steps for repeating the processes of converting input data into an input pattern image and displaying the input pattern image on the screen of the monitor 18. That is, during the data entry, the input coordinate data is successively accumulated in the input pattern storage area and the input pattern image is updated successively in each frame on the screen according to the accumulated coordinate data. Therefore, when the user manipulates the input device such as the mouse 417 or the left or right joystick 70, 72 to input coordinate data into the entertainment apparatus 12, the user can visually recognize that the input pattern image is drawn on the screen of the monitor 18 in real time.

When the data entry is finished, i.e., the drawing of the present input pattern image is finished, control passes to step S7 for confirming the coordinate data corresponding to the input pattern image. The input pattern image drawn in this manner forms an input geometric shape. Then, in step S8, the geometric shape judging means 306 determines a type of the input geometric shape indicated by the input pattern image based on a plurality of judging criterion such as the above-described judging criterion for the straight line 204a and the circle 204b.

When a type of the input geometric shape is determined in step S8, control passes to step S9. In step S9, the accuracy calculating means 312 calculates accuracy of the input geometric shape based on the number of deviations from an allowable range of a judging criteria used in judgment. For example, if there is no deviation from an allowable range of a judging criteria for the straight line 204a, i.e., a segment (the input geometric shape) is positioned within an acceptable deviation width Wa in FIG. 7A or an acceptable aberration width Wb in FIG. 7B, the segment is judged as a straight line in step S8. Then, the accuracy calculating means 312 determines whether the straight line is positioned within the more limited range, i.e., another acceptable deviation width Wa or another acceptable aberration width Wb, and counts the number of deviations in step S9.

If the accuracy calculating means 312 determines that the straight line is positioned in the more limited range, i.e., the counted number is "0", the straight line is judged as a perfect straight line (100% accuracy). The percentage of the accuracy is inversely proportional to the number of deviations. The judgment for the circle 204 can be carried out in the same manner.

Next, in step S10 of FIG. 16, a symbolic image corresponding to the present input coordinate data (input geometric shape) is selected based on a symbolic image information table 320 as shown in FIG. 17, for example. The symbolic image information table 320 stores coordinate information, a type of a geometric shape, a type of a symbolic image, a header address of an appearance animation data file 322, and header addresses of modified animation data files 324 in each record. The appearance animation data file 322 is used for defining an animation pattern in displaying a symbolic image. The modified animation data files 324 are used for defining animation patterns in modifying (changing) a symbolic image. In FIG. 17, arbitrary numeric values or codes can be registered in respective blank portions.

The modified animation data files 324 can define four animation patterns (levels 1 through 4) for each of symbolic images depending on the accuracy of the input pattern image. That is, in the record of the symbolic image information table 320, four header addresses for the four modified animation data files 324 are stored. In the modified animation data file 324, animation data for displaying an animation of gradually deforming (destructing) a symbolic image as an object displayed on the screen in stored. When the accuracy of the input geometric shape is bad, the object is destructed seriously.

It is also possible to define only two levels of accuracy, i.e., a perfect input geometric shape and an imperfect geometric shape. In this case, only one modified animation data file 324 is used. For example, an image of a pyramid shown in FIG. 6A is maintained or collapsed depending on the accuracy of the input geometric shape.

It should be understood that different symbolic image information tables 320 can be used selectively depending on a selected scene.

When a symbolic image is selected in step S10, control passes to step S11. In step S11, the image appearance displaying means 308 reads an appearance animation data file 322 for the selected symbolic image based on the header address of the appearance animation data file 322 in the record of the symbolic image information table 320, and displays an animation of the symbolic image based on the read appearance animation data file 322.

Then, in step S12, it is determined whether the input geometric shape is a perfect geometric shape (100% accuracy) or not. If the input geometric shape is not a perfect geometric shape, control passes to step S13. In step S13, the modification displaying means 314 read a modified animation data file 324 based on accuracy of the input geometric shape and display an animation of destructing the symbolic image displayed on the screen. That is, the symbolic image is collapsed depending on the accuracy of the input geometric shape.

If the input geometric shape is a perfect geometric shape (100% accuracy), control passes to step S14. In step S14, the present information is registered in a scenario advancement information file 326. As shown in FIG. 18, the scenario advancement information file 326 is a sequential file. Information is registered in the scenario advancement information file 326 by updating the records of the scenario advancement information file 326. Each record of the scenario advancement information file 326 stores data of a symbolic image, i.e., a type of a symbolic image and a display area of the symbolic image. Further, the record may store conditions for activating a program (program activating conditions), and a program number of the program. In FIG. 18, arbitrary numeric values or codes can be registered in respective blank portions.

For example, the program activating conditions include a type of an associated symbolic image, i.e., a symbolic image associated with the symbolic image of the record for activating an animation program, a display area of the associated symbolic image, the number of associated symbolic images needed for activating the program, and a counter for counting the number of associated symbolic images currently displayed on the screen.

Program activating conditions of a symbolic image "pond" will be described as an example. If there are two or more clouds above a pond, a river flowing from the pond is displayed on the screen. That is, an associated symbolic image of the symbolic image "pond" is the "cloud" and an display area of the associated symbolic image is coordinate data indicating an area above the pond, and the number of associated symbolic images needed for activating the program is "2".

Further, assuming that a straight line 204a is drawn in the sky, a cloud 214 and a pond 216 are displayed on the screen. In this case, the "cloud" is registered as a type of a symbolic image, and coordinate data of the straight line 204a is registered as a display area of the symbolic image in the first record of the scenario advancement information file 326. Then, the "pond" is registered as a type of a symbolic image, coordinate data of the pond is registered as a display area of the symbolic image, the "cloud" is registered as an associated symbolic image for activating a program, coordinate data indicating an area above the pond is registered as a display area of the associated symbolic image, "2" is registered as the number of associated symbolic images needed for activating the program, and "1" is registered as a value of a counter for counting the number of associated symbolic images currently displayed on the screen in the second record of the scenario advancement information file 326. Further, a number assigned to the program is registered as a program number in the second record of the scenario advancement information file 326. In this case, when the program is activated, an animation of a river flowing from a pond is displayed on the screen.

In the same manner, when a gushing oil 212 is displayed as a fourth symbolic image by drawing a small circle 204b in the desert, for example, the fourth record of the scenario advancement information file 326 is updated. That is, the "gushing oil" is registered as a type of a symbolic image, coordinate data of the small circle 204b is registered as a display area of the symbolic image, the "sun" is registered as an associated symbolic image for activating a program, coordinate data indicating an area above the small circle 204b is registered as a display area of the associated symbolic image, "2" is registered as the number of associated symbolic images needed for activating the program, and "1" is registered as a value of a counter for counting the number of associated symbolic images currently displayed on the screen. Further, a number assigned to the program is registered as a program number. In this case, when the program is activated, an animation of burning oil, i.e., a burning oil 232 is displayed on the screen.

When the data registration process in the scenario progressing advancement information file 326 is finished, control passes to step S15 for performing the process of the scenario advancing means 302.

Figure 19:
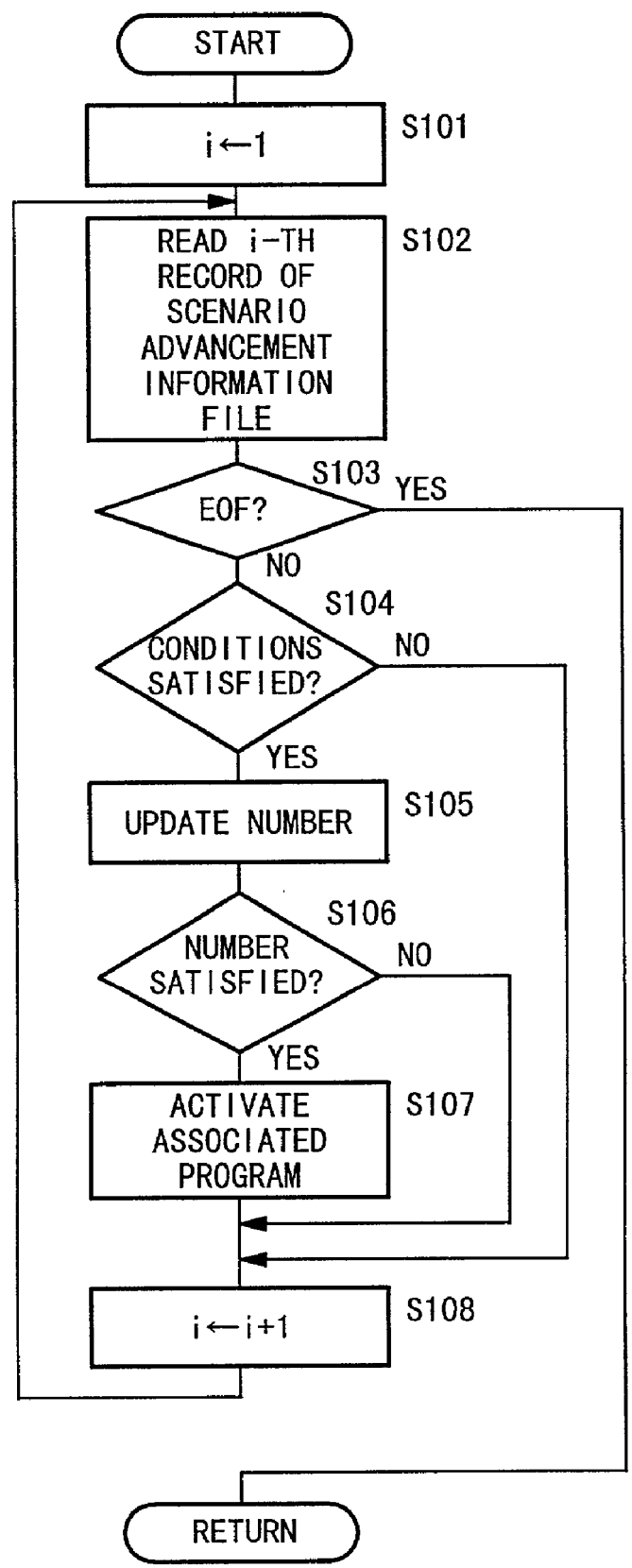
FIG. 19 is a flowchart showing a processing sequence of the scenario advancing means of the present embodiment.

A processing sequence of the scenario advancing means 302 will be described with reference to FIG. 19. In step S101, an index register i for retrieving a record from the scenario advancement information file 326 is initialized by registering an initial value "1" in the index register i.

Next, in step S102, an i-th record of the index register i is read. Then, in step S103, it is determined whether the read record contains data for ending the process of the scenario advancing means 302 or not. Specifically, it is determined whether the read record contains EOF (End of File) data or not.

If it is determined that the read record does not contain data for ending the process of the scenario advancing means 302, control passes to step S104. In step S104, it is determined whether program activating conditions in the read record are satisfied or not except a condition concerning the number of associated symbolic images. Specifically, it is determined whether the present symbolic image is an associated symbolic image in the read record or not, and it is determined whether coordinate data indicating the display area of the present symbolic image corresponds to coordinate data in the program activating conditions, i.e., coordinate data indicating an display area of the associated symbolic image or not. If these conditions are satisfied, control passes to step S105. In step S105, the counter indicating the number of associated symbolic images is updated by incrementing the value of the counter by 1.

Then, in step S106, it is determined whether the condition concerning the number of associated symbolic images is satisfied by the updated value of the counter or not. If the condition concerning the number of associated symbolic images is satisfied, control posses to step S107. In step S107, a program corresponding to a program number registered in the read record is activated. By activating the program, an animation such as a river flowing from a pond or a burning oil is displayed on the screen.

When the process in step S107 is finished, or if it is determined that the condition concerning the number of associated symbolic images is not satisfied in step S106 or if it is determined that the program activating conditions in the read record are not satisfied in step S104, control passes to step S108 for updating the index register i by incrementing the value of the index register by 1. Then, control passes back to step S102 for repeating the processes in step S102 and the subsequent steps.

If it is determined that the read record contains data for ending the process of the scenario advancing means 302 in step S103, the process of the scenario advancing means 302 is brought to an end.

Then, control passes back to the main routine of FIG. 16. In step S16, it is determined whether there is a request for ending the current scene. Specifically, it is determined whether a command for requesting to display the menu screen is inputted from the user or not. If there is no request for ending the current scene, control passes back to step S3 of FIG. 15 to wait for another data entry of a geometric shape from the user.

If there is a request for ending the current scene, control passes to step S17. In step S17, it is determined whether there is a program ending request (game over, power off, etc.) or not. If there is no program ending request, control passes back to step S1 of FIG. 15 for repeating the processes in step S1 and the subsequent steps. If there is a program ending request, the process of the image processing means 300 is brought to an end.

As described above, according to the image processing means 300 of the present embodiment, a symbolic image is selected from a plurality of symbolic images available for a scene currently displayed on the monitor 18 based on an input geometric shape indicated by an input pattern image drawn according to data inputted by the user with an input device such as the manual controller 16 and the mouse 417. Accordingly, when the user draws a straight line 204a as a geometric shape, for example, a pyramid 206 is displayed on the monitor 18 suddenly and unintentionally. Therefore, it is possible to create a novel game in which an interesting aspect is added to the operation of inputting geometric shapes. The concept of the present embodiment can be applied to various video games and effectively utilized to prevent the user from losing interest in the video games.

In particular, according to the present embodiment, in addition to the image processing means 300, the program comprises the scenario advancing means 300 for controlling the progress of the a scenario according to the scene currently displayed on the screen by the image processing means 300. Thus, the progress of the scenario can be controlled variously according to the geometric shapes drawn by the user so that development of the scenario can be made unpredictable for the user. Thus, an interesting aspect can be added to the game.

Since the image processing means 300 comprises the image form determining means 310 for determining a form of the symbolic image based on accuracy of an inputted geometric shape which is judged based on a plurality of judging criterion. That is, since the user can draw perfect symbolic images and various forms of imperfect symbolic images freely on the screen of the monitor 18, it is possible for the user to express his feelings on the monitor 18 variously utilizing various forms of the symbolic images.

Next, a modified embodiment of the present invention having a function different from the above-described first function will be described with reference to FIGS. 20A through 41.

Figure 20A:
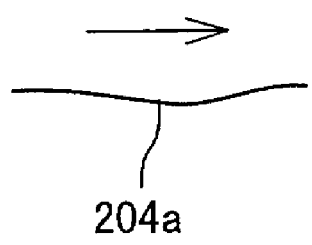
FIG. 20A is a view of a straight line in which it is assumed that the straight line is drawn from left to right.
Figure 20B:
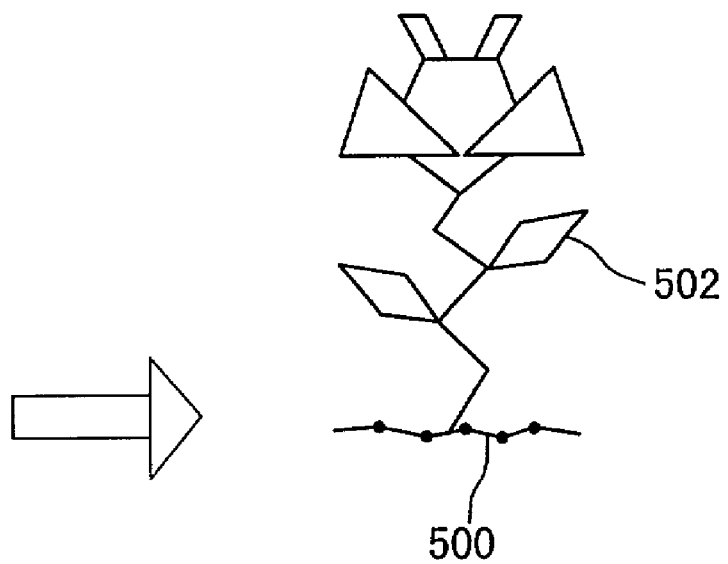
FIG. 20B is a view of a straight line image (basic image) and a flower symbolic image in which the straight line image and the flower symbolic image are displayed by drawing the straight line from left to right.

The function of the modified embodiment is to arbitrarily move symbolic images on the screen according to BGM (background music) sounds. In FIG. 20A, it is assumed that a user draws a straight line 204a from left to right, for example. When drawing data is inputted form the user, a straight line image (basic image) 500 having a plurality of nodal points is drawn from left to right on the screen with a sound effect. Then, a flower image (symbolic image) 502 is displayed on the screen with a sound effect as shown in FIG. 20B. The flower image 502 moves to the accompaniment of a BGM. For example, assuming that the flower image 502 expands and contracts vertically at a predetermined timing, i.e., according to the BGM, when the flower image 502 stretches out upwardly, a sound corresponding to the movement of the flower image 502 is outputted from a speaker. The basic image 500 also moves (waves up and down) according to the BGM.

In displaying the basic image 500, sounds of an arbitrary sound pattern can be outputted from the speaker. For example, sounds in C scale may be outputted while the basic image 500 is drawn, i.e., during a period of time from the starting point to the ending point of drawing.

Other symbolic images 502 and moving patterns (animation patterns) thereof will be described with reference to examples shown in FIGS. 21A through 27.

Figure 21A:
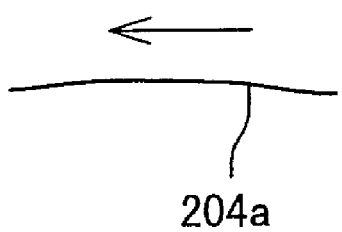
FIG. 21A is a view of a straight line in which it is assumed that the straight line is drawn from right to left.
Figure 21B:
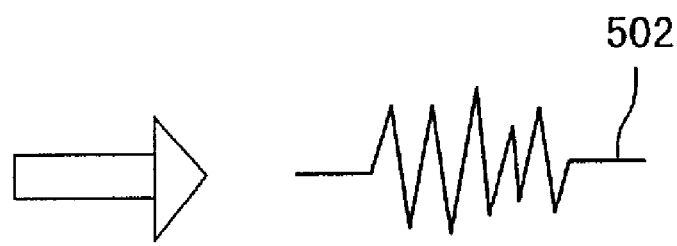
FIG. 21B is a view of a zigzag symbolic image in which the zigzag symbolic image is displayed after a straight line image (basic image) is displayed by drawing the straight line from right to left.

In FIG. 21A, it is assumed that a user draws a straight line 204a from right to left, for example. When drawing data is inputted from the user, a straight line image (basic image) 500 having a plurality of nodal points is drawn from right to left on the screen with a sound effect. Then, the basic image 500 disappears from the screen and a zigzag image (symbolic image) 502 is displayed on the screen with a sound effect in place of the basic image 500 as shown in FIG. 21B. The zigzag image 502 changes its form variously to the accompaniment of a BGM. For example, it is assumed that the waveform of the zigzag image 502 expands and contracts vertically. When the waveform is fully expanded, a sound of the zigzag image 502 is outputted from the speaker. The sound of the zigzag image 502 is different from the sound of the flower image 502.

In FIG. 22A, it is assumed that a user draws a circle 204b clockwise, for example. When drawing data is inputted from the user, a circle image (basic image) 500 having a plurality of nodal points is drawn clockwise on the screen with a sound effect. Then, the basic image 500 disappears from the screen and a firework image (symbolic image) 502 is displayed on the screen with a sound effect in place of the basic image 500 as shown in FIG. 22B. The firework image 502 expands and contracts to the accompaniment of a BGM. When the firework image 502 is fully expanded, a sound is outputted.

Figure 23A:
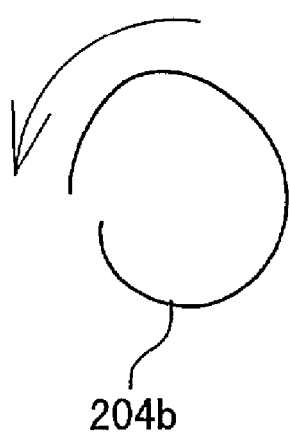
FIG. 23A is a view of a circle in which it is assumed that the circle is drawn counterclockwise.
Figure 23B:
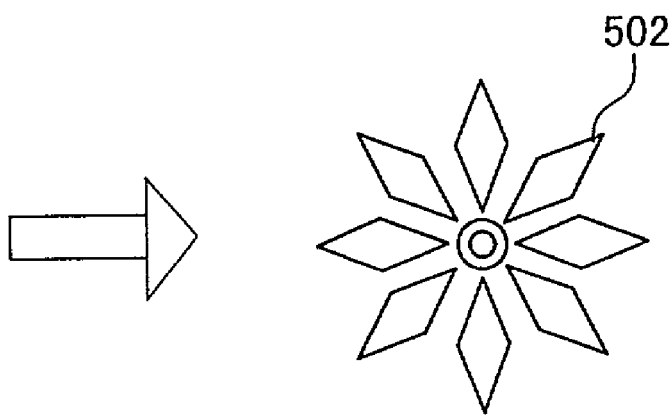
FIG. 23B is a view of another firework symbolic image in which the firework symbolic image is displayed after a circle image (basic image) is displayed by drawing the circle counterclockwise.

In FIG. 23A, it is assumed that a user draws a circle 204b counterclockwise, for example. When drawing data is inputted from the user, a circle image (basic image) 500 having a plurality of nodal points is drawn counterclockwise on the screen with a sound effect. Then, the basic image 500 disappears from the screen and another firework image (symbolic image) 502 is displayed on the screen with a sound effect in place of the basic image 500 as shown in FIG. 23B. The firework image 502 expands and contracts to the accompaniment of a BGM. When the firework 502 is fully expanded, a sound is outputted.

Figure 24A:
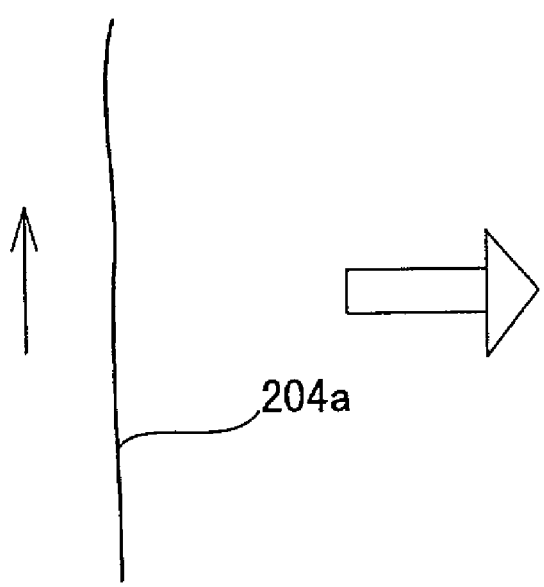
FIG. 24A is a view of a straight line in which it is assumed that the straight line is drawn upwardly.
Figure 24B:
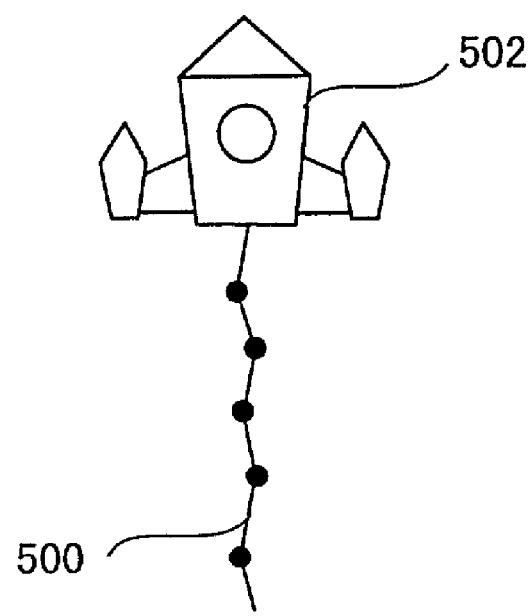
FIG. 24B is a view of a rocket symbolic image in which the rocket symbolic image is displayed after a straight line image (basic image) is displayed by drawing the straight line upwardly.

In FIG. 24A, it is assumed that a user draws a straight line 204a upwardly, for example. When drawing data is inputted from the user, a straight line image (basic image) 500 having a plurality of nodal points is drawn upwardly with a sound effect. Then, a rocket image (symbolic image) 502 is displayed on the screen with a sound effect as shown in FIG. 24B. The rocket image 502 moves (flies) out of the screen to the accompaniment of a BGM. At this time, a roaring sound of the rocket is also outputted. The basic image 500 disappears from the screen together with the rocket image 502.

Figure 25A:
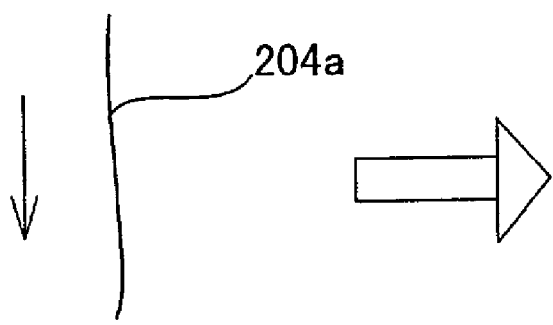
FIG. 25A is a view of a straight line in which it is assumed that the straight line is drawn downwardly.
Figure 25B:
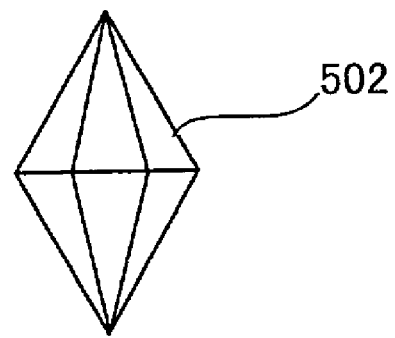
FIG. 25B is a view of a diamond symbolic image in which the diamond symbolic image is displayed after a straight line image (basic image) is displayed by drawing the straight line downwardly.

In FIG. 25A, it is assumed that a user draws a straight line 204a downwardly, for example. When drawing data is inputted from the user, a straight line image (basic image) 500 having a plurality of nodal points is drawn downwardly. Then, the basic image 500 disappears from the screen and a diamond image (symbolic image) 502 is displayed on the screen with a sound effect in place of the basic image 500 as shown in FIG. 25B. The diamond image 502 expands and contracts to the accompaniment of a BGM. When the diamond image 502 is fully expanded, a sound is outputted.

Figure 26A:
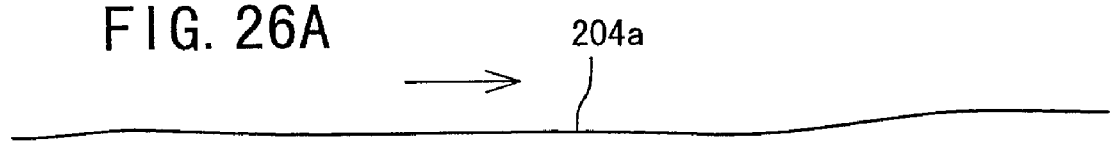
FIG. 26A is a view of a relatively long straight line in which it is assumed that the straight line is drawn from left to right.
Figure 26B:
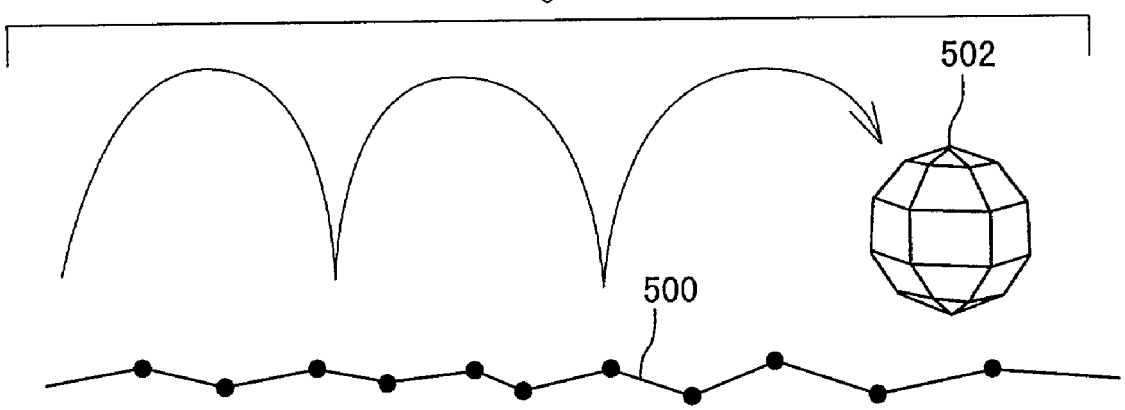
FIG. 26B is a view of a straight line image (basic image) and a ball symbolic image in which the straight line image and the ball symbolic image are displayed by drawing the relatively long straight line from left to right.

In FIG. 26A, it is assumed that a user draws a relatively long straight line 204a from left to right, for example. When drawing data is inputted form the user, a straight line image (basic image) 500 having a plurality of nodal points is drawn from left to right on the screen with a sound effect. Then, a ball image (symbolic image) 502 is displayed on the screen with a sound effect as shown in FIG. 26B. The ball image 502 bounces up and down and moves left to right to the accompaniment of a BGM. The basic image 500 also moves (waves up and down) according to the BGM.

Figure 27:
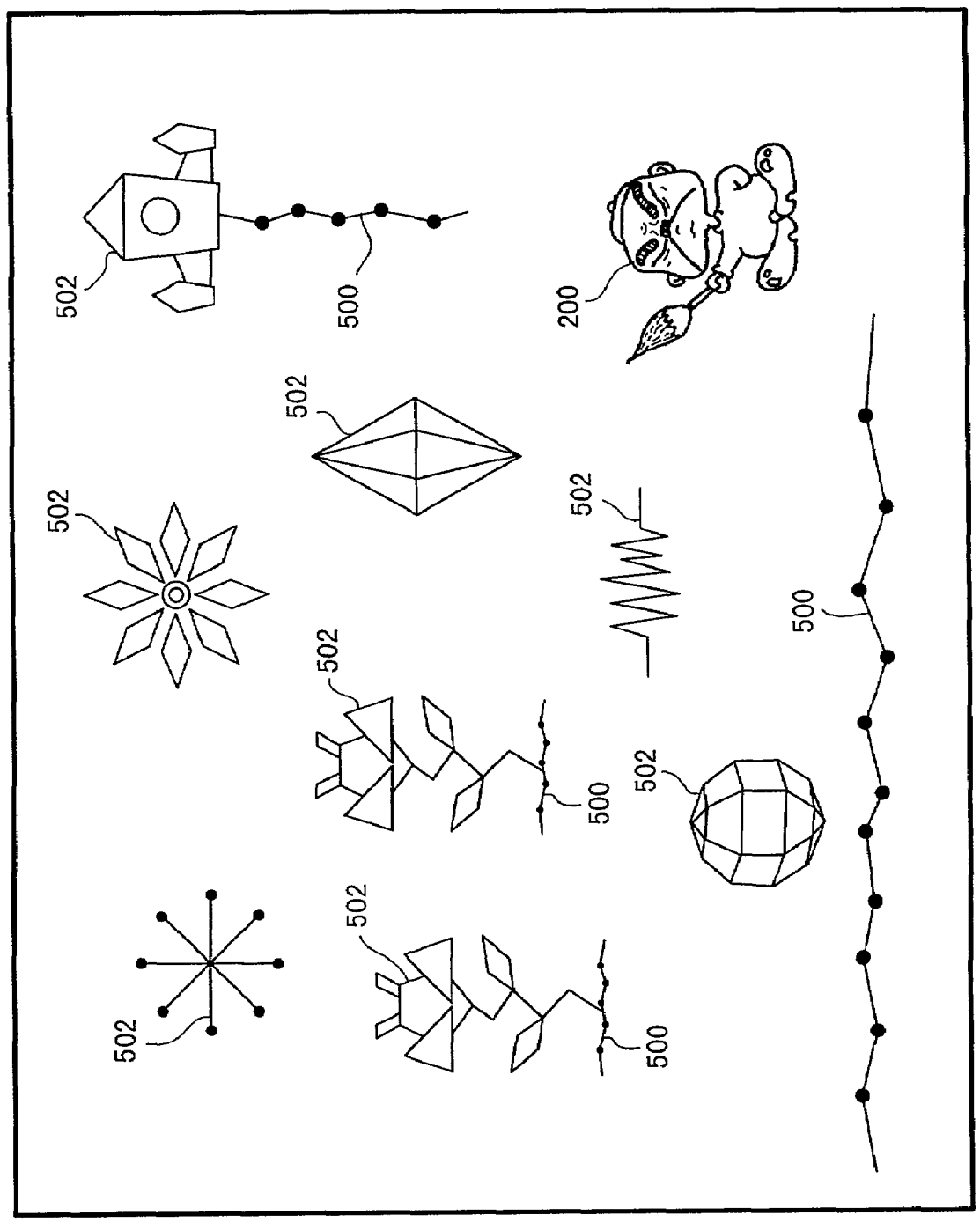
FIG. 27 is a view of various symbolic images displayed on the screen of the monitor.

As shown in FIG. 27, it is possible to draw these symbolic images 502 at arbitrary positions on the screen of the monitor 18. That is, the various symbolic images 502 moves according to a BGM and characteristic sounds of the symbolic images 502 are outputted at arbitrary intervals in timing with (at a tempo of) the BGM.

Next, an example of software (image processing means 600) for carrying out the above function according to the modified embodiment will be described with reference to FIGS. 28 through 41.

As described above, the image processing means 600 is supplied by a randomly accessible recording medium such as the optical disk 20 or the memory card 14, or supplied through a network. In the following description, it is assumed that the image processing means 600 is read from the optical disk 20 and executed by the entertainment apparatus 12.

Specifically, as shown in FIG. 2, a certain optical disk 20 is played back by the entertainment apparatus 12 to read the image processing means 600. The image processing means 600 read from the optical disk 20 is stored in the RAM 402 of the entertainment apparatus 12 by a predetermined process and executed by the CPU 401.

Figure 28:
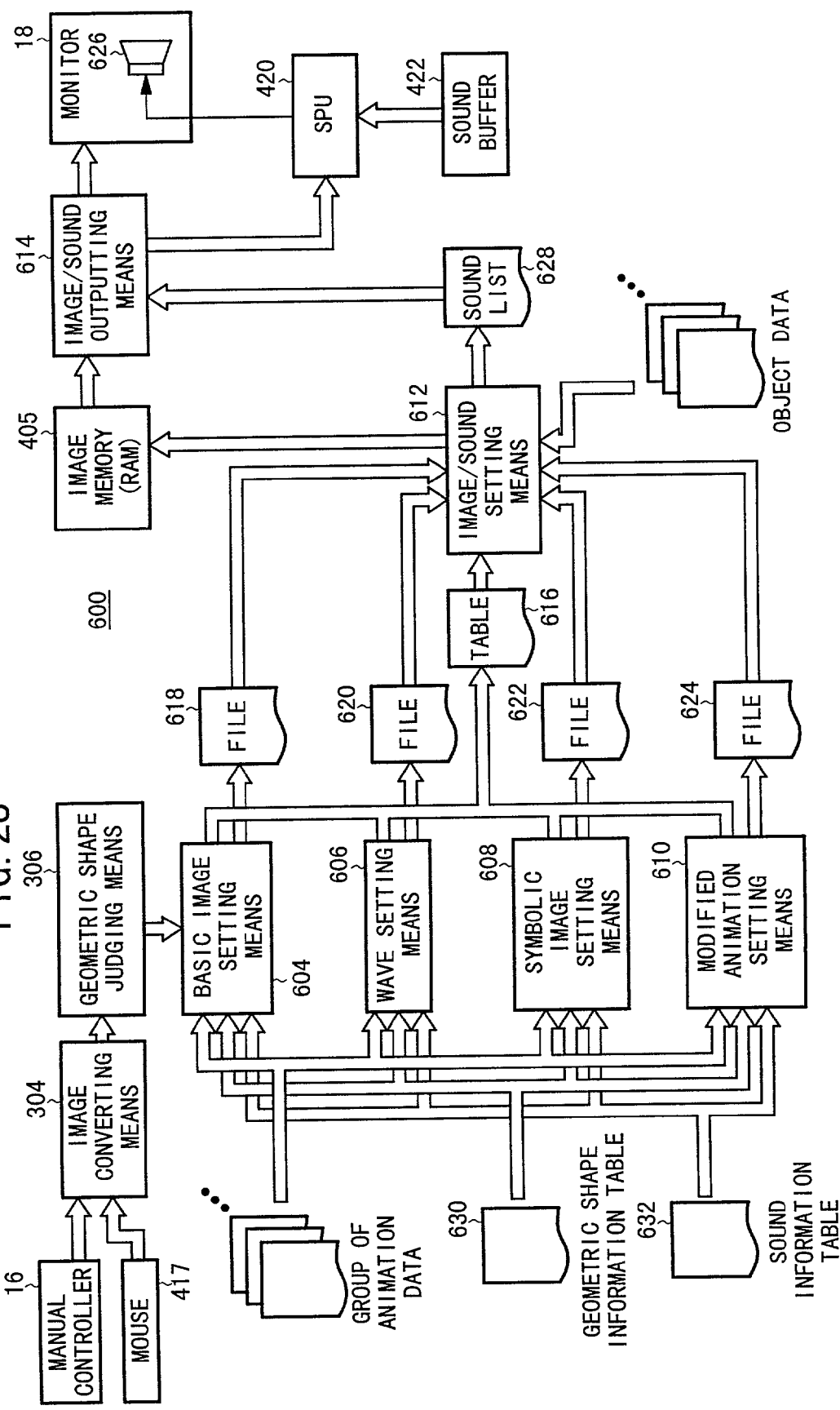
FIG. 28 is a functional block diagram showing a structure of image processing means according to a modified embodiment of the present invention.
Figure 29:
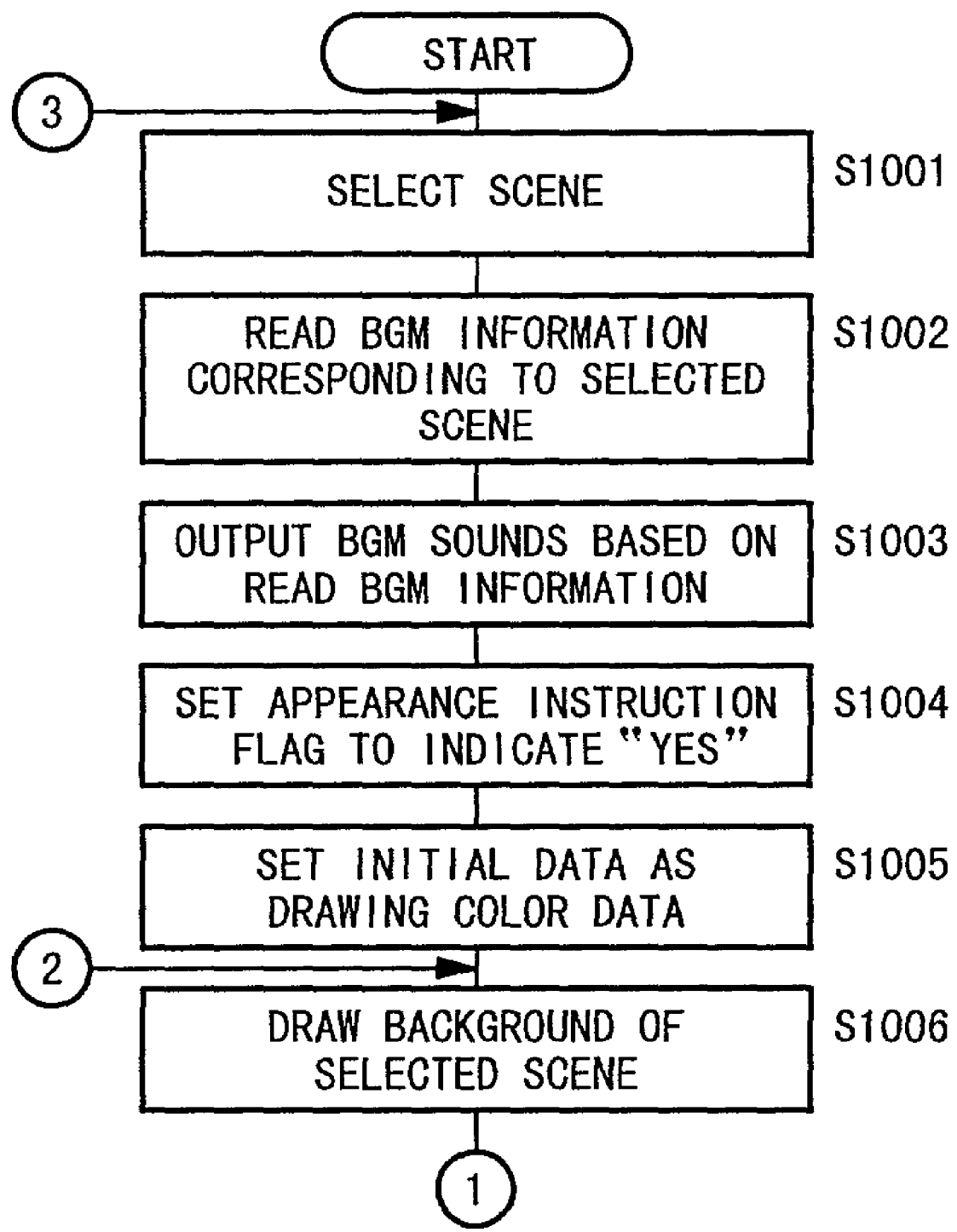
FIG. 29 is a flowchart (No. 1) showing a processing sequence of the image processing means of the modified embodiment.

As shown in FIG. 28, the image processing means 600 comprises image converting means 304 for converting manipulation data inputted form the mouse 417 or the manual controller 16 into an input pattern image, geometric shape judging means 306 for determining a type of an input geometric shape indicated by the input pattern image based on a plurality of geometric shape judging criterion.

Further, the image processing means 600 comprises basic image setting means 604, wave setting means 606, symbolic image setting means 608, and modified animation setting means 610. The basic image setting means 604 performs image settings and sound settings for displaying a basic image 500 according to drawing data (geometric shape data and drawing direction data). The wave setting means 606 performs image settings for keeping the basic image 500 to wave on the screen. The symbolic image setting means 608 performs image settings and sound settings for at least displaying a symbolic image 502 according to an input geometric shape on the screen. The modified animation setting means 610 performs image settings and sound settings for changing a form of the symbolic image 502 or moving the symbolic image 502 according to a BGM.

The image processing means 600 further comprises image/sound setting means 612 and image/sound outputting means 614.

The image/sound setting means 612 generates image data for drawing the symbolic image 502 and moving the symbolic image 502 according to an information table 616 containing various data set by the respective setting means, and animation data files 618 through 624 and stores the generated image data in the image memory 405. Further, the image/sound setting means 612 registers sound information in a sound list 628.

The image/sound outputting means 614 outputs image data drawn in the image memory 405 on the monitor 18 for displaying the appearance and movement of the symbolic image 502 on the screen of the monitor 18. Further, the image/sound outputting means 614 outputs sound information (sound data) registered in the sound list 628 to the SPU 420 for outputting various sounds from a speaker 626 of the monitor 18.

Next, a processing sequence of the image processing means 600 will be described with reference to flowcharts shown in FIGS. 29 through 41.

In step S1001, a scene is selected. Specifically, the user inputs a command to select a scene on the menu screen with an input device such as the mouse 417 or the left or right joystick 70, 72.

When a scene is selected, control passes to step S1002. In step S1002, BGM information corresponding to the selected scene is read from the optical disk 20. Then, in step S1003, a piece of BGM (BGM sounds) is reproduced based on the read BGM information. The BGM is kept reproduced until another scene is selected.

Next, in step S1004, appearance (drawing) of symbolic images 502 is enabled by setting "1(YES)" to an appearance instruction flag. That is, in this mode, the user can draw symbolic images 502 by inputting drawing data with the input device. Then, drawing color data is initialized by setting initial data as the drawing color data. In this manner, a default color, for example, "black" is set as a drawing color. In step S1006, a background image of the selected scene is drawn in the image memory 405.

Figure 30:
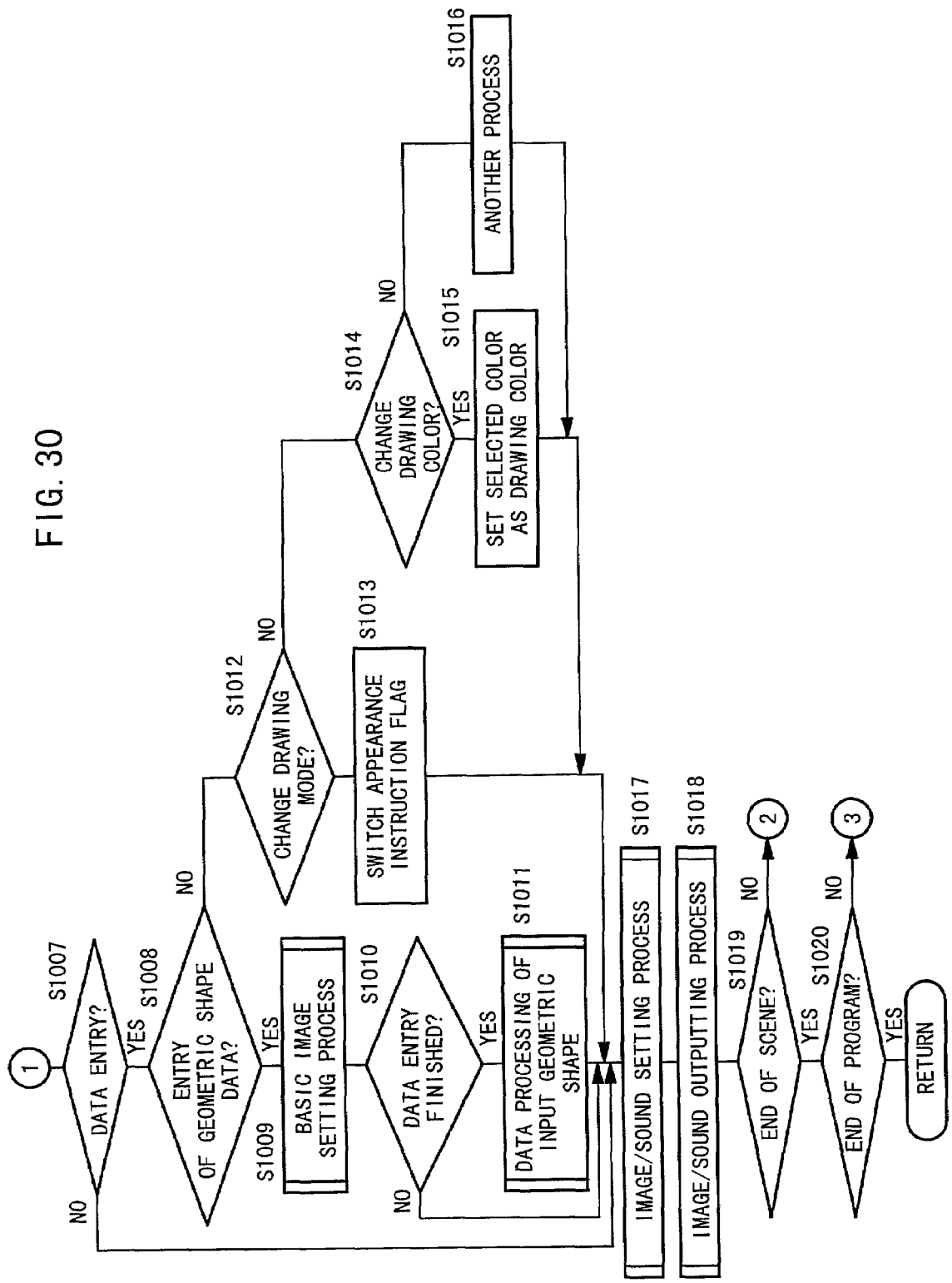
FIG. 30 is a flowchart (No. 2) showing a processing sequence of the image processing means of the modified embodiment.
Figure 31:
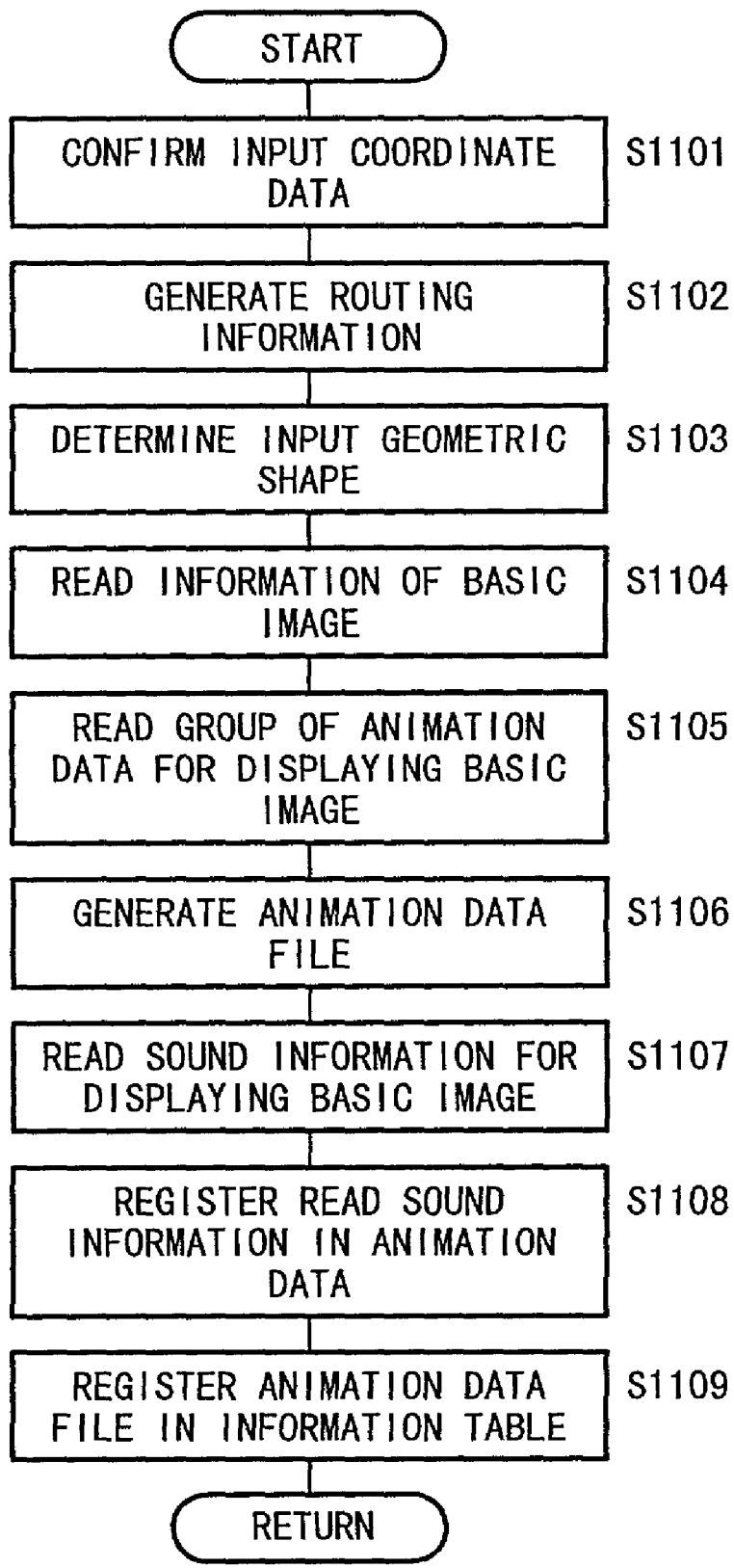
FIG. 31 is a view showing a processing sequence of basic image setting means.

Then, in step S1007 of FIG. 30, it is determined whether there is a data entry from the user or not. If there is a data entry, control passes to step S1008. In step S1008, it is determined whether the data entry is an entry of geometric shape data from the input device or not.

If it is determined that the data entry is an entry of geometric shape data, control passes to step S1009 for performing the processes in step S1009 and the subsequent steps. If it is determined that the data entry is not an entry of geometric shape data, control passes to step S1012. In step S1012, it is determined whether the data entry is an instruction for enabling or disabling symbolic images 502 to be drawn on the screen or not. Specifically, it is determined whether the user has manipulated the mouse 417, or the left or right joystick 70, 72 to click an icon or a character for enabling or disabling the drawing of symbolic images 502 or not.

If the data entry is an instruction for enabling or disabling symbolic images 502 to be drawn on the screen, the present value of the appearance instruction flag is changed. That is, if the present value of the appearance instruction flag is "1(YES)" for enabling symbolic images 502 to be drawn on the screen, the value of the appearance instruction flag is changed to "0(NO)" for disabling symbolic images 502 to be drawn on the screen. If the present value of the appearance instruction flag is "0(No)" for disabling symbolic images 502 to be drawn on the screen, the value of the appearance instruction flag is changed to "1(YES)" for enabling symbolic images 502 to be drawn on the screen.

If it is determined that the data entry is not an instruction for enabling or disabling symbolic images 502 to be drawn on the screen, control passes to step S1014. In step S1014, it is determined whether the data entry is an instruction for changing the drawing color or not. Specifically, it is determined whether the user has manipulated the mouse 417, or the left or right joystick 70, 72 to click an icon or a character for changing the drawing color or not.

If it is determined that the data entry is an instruction for changing the drawing color, control passes to step S1015 for changing the present drawing color to the newly selected drawing color.

If it is determined that the data entry is not an instruction for changing the drawing color, control passes to step S1016 for performing another process depending on manipulation data inputted from the mouse 417, or the left or right joystick 70, 72.

When any one of the processes in step S1013, step S1015, and step S1016 is finished, control passes to step S1017 for performing the processes in step S1017 and the subsequent steps.

If it is determined that the data entry is an entry of geometric shape data in S1008, control passes to step S1009 for performing the process of the basic image setting means 604. A processing sequence of the basic image setting means 604 will be described with reference to FIG. 31. In step S1101, coordinate data of the input pattern image indicative of an input geometric shape (geometric shape data) is confirmed. The coordinate data is stored in the input pattern storage area. Then, in step S1102, routing information indicative of a drawing direction the input geometric shape (drawing direction data) is generated. The routing information is generated based on information stored in the input pattern storage area, i.e., the coordinate data successively inputted by the mouse 417, or the left or right joystick 70, 72.

Next, in step S1103, the geometric shape judging means 306 determines a type of the input geometric shape indicated by the input pattern image based on a plurality of judging criterion such as the above-described judging criterion for the straight line 204a and the circle 204b.

When a type of the input geometric shape is determined, control passes to step S1104. In step S1104, information (e.g., an object number) of a basic image 500 corresponding to the determined type of the input geometric shape is read from a geometric shape information table 630 (see FIG. 28). Specifically, information of a basic image 500 having a plurality of nodal points is read according to the present drawing data (geometric shape data and drawing direction data).

Figure 33:
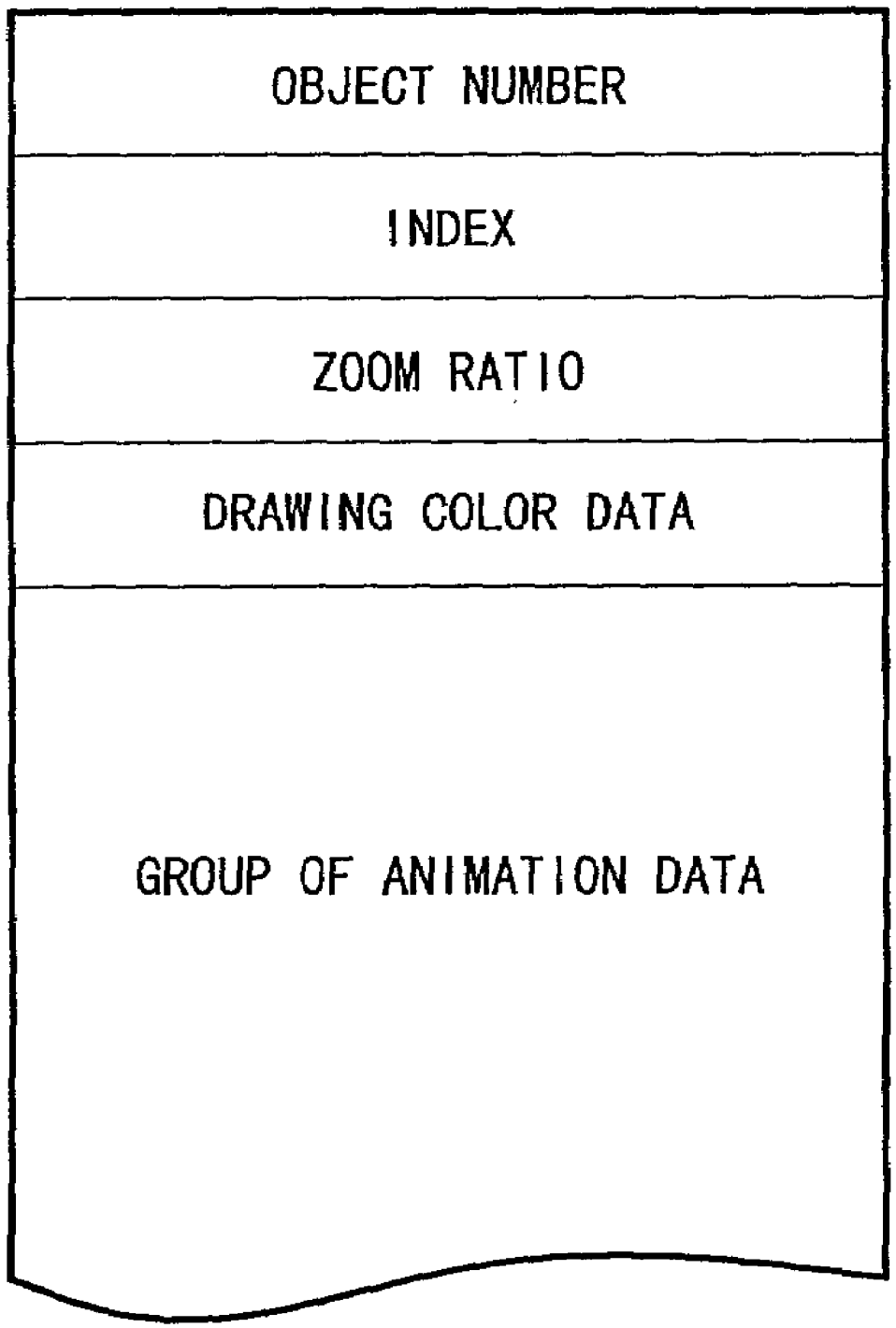
FIG. 33 is a view showing details of an animation data file.

Then, in step S1105, a group of animation data for displaying the present basic image 500 according to the present drawing data (geometric shape data and drawing direction data) is read from the optical disk 20. Then, in step S1106, an animation data file 618 for displaying the basic image 500 is generated. The symbolic image 502 appears on the screen according to an animation pattern set in the animation data file 618. The animation data file 618 has a data structure in which an object number, an index (an index for retrieving animation data), a zoom ratio, and drawing color data, and the read group of animation data are stored as shown in FIG. 33, for example. Other animation data files as described later all have the same data structure.

Next, in step S1107, information (sound information) concerning sounds to be outputted at the time of displaying the basic image 500 is read from a sound information table 632 (see FIG. 28) based on the type of the input geometric shape, for example. Then, in step S1108, the read sound data is registered in the animation data selected from the group of animation data registered in the animation data file 618.

Figure 34:
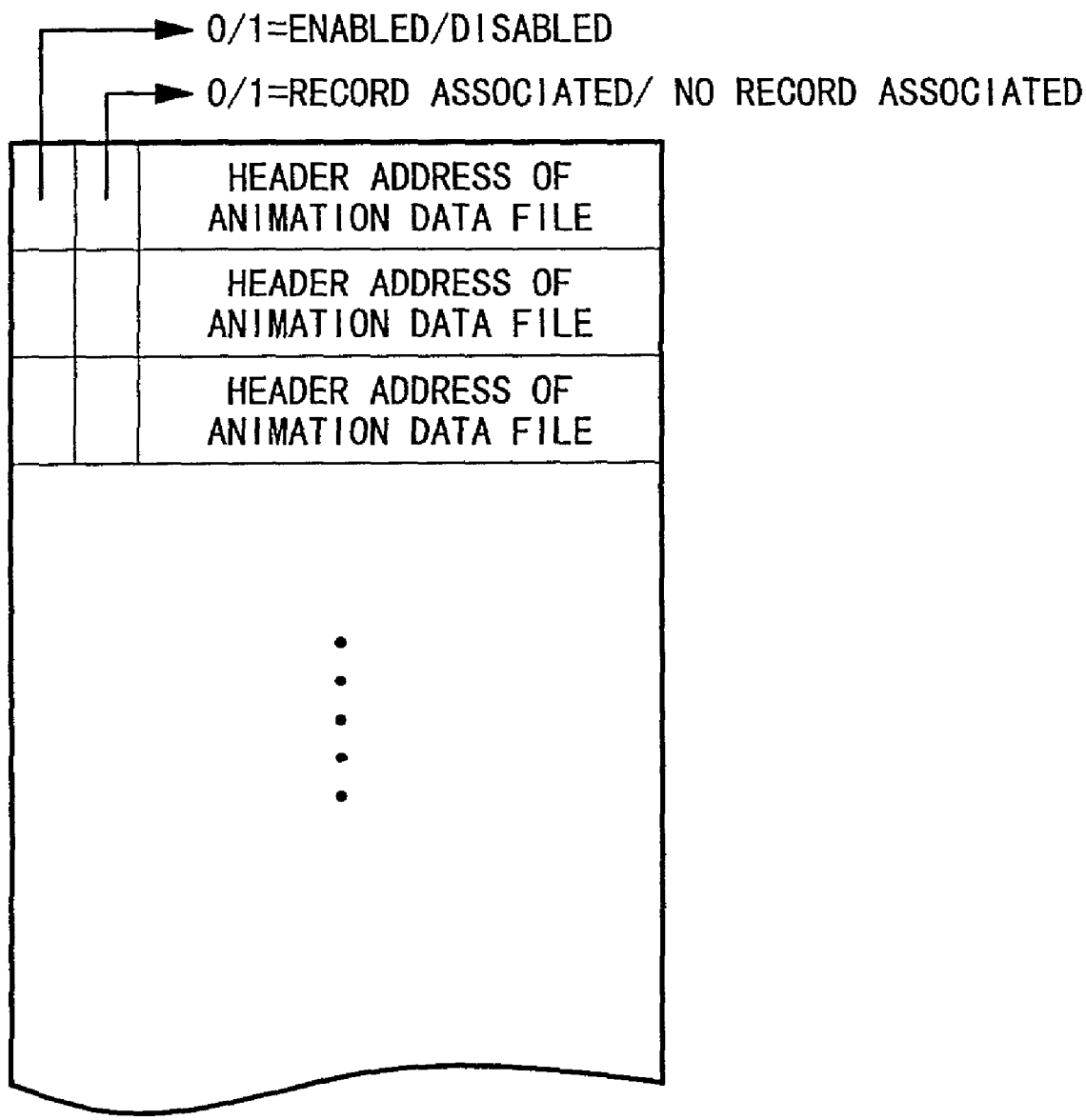
FIG. 34 is a view showing details of an information table.
Figure 35:
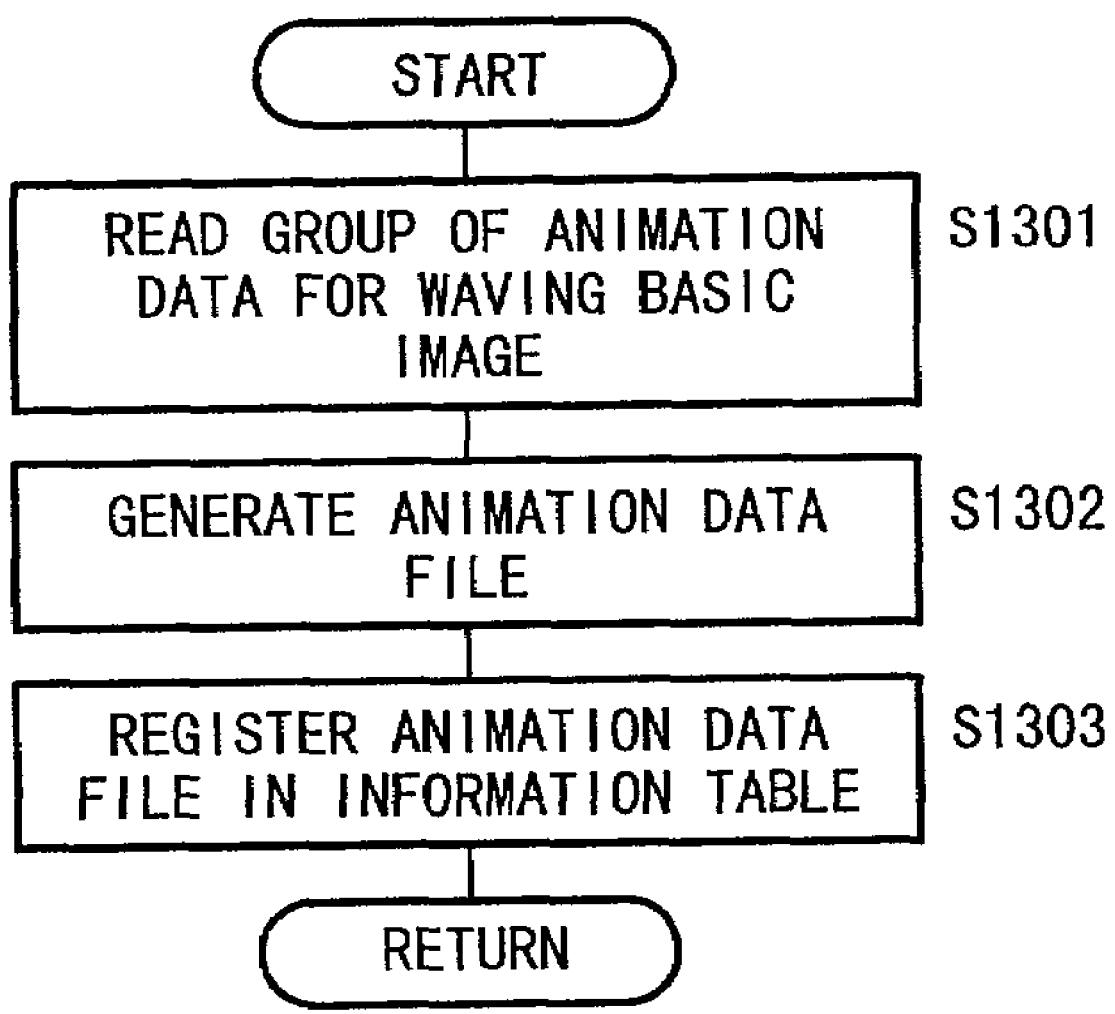
FIG. 35 is a flowchart showing a processing sequence of wave setting means.
Figure 36:
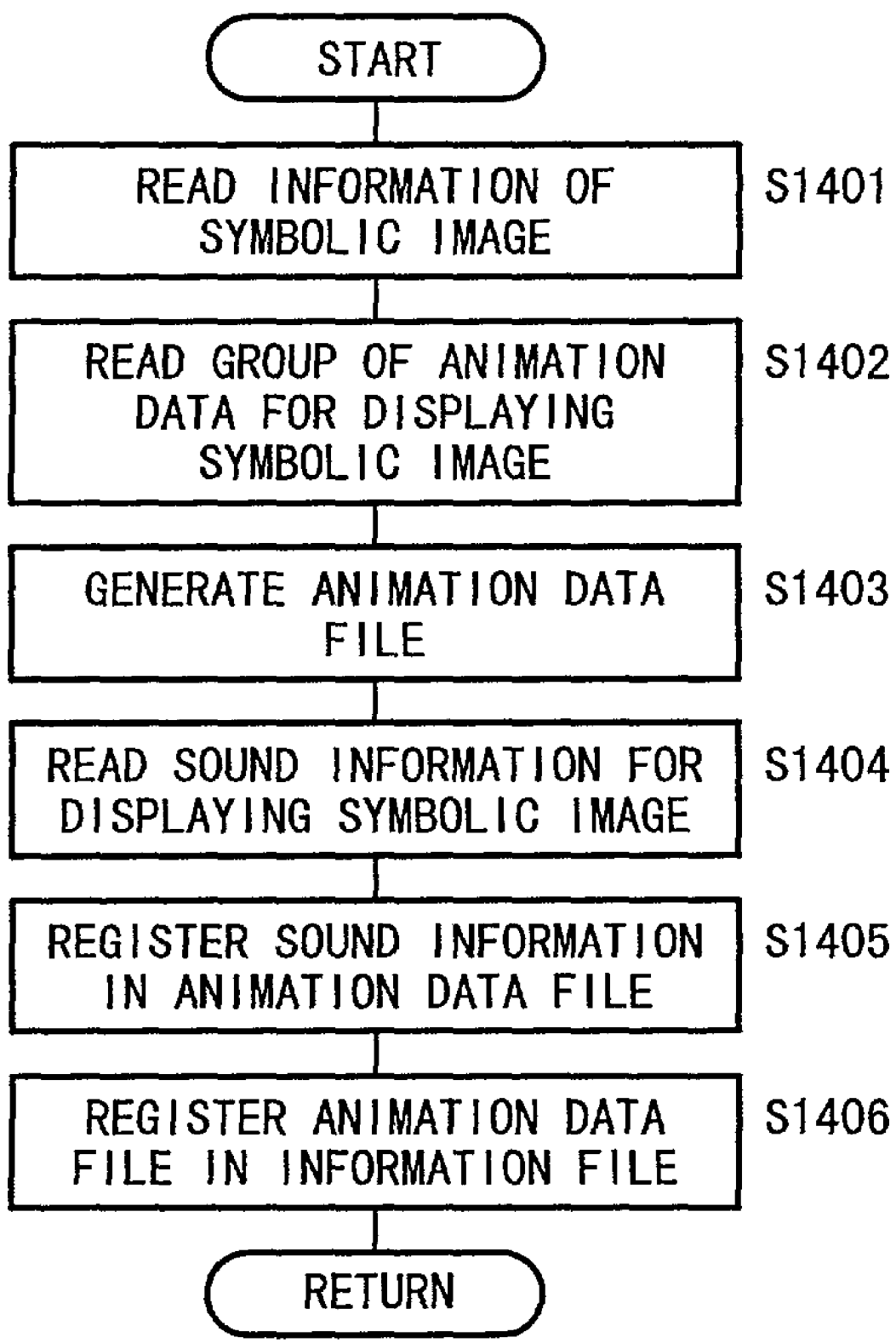
FIG. 36 is a flowchart showing a processing sequence of symbolic image setting means.
Figure 37:
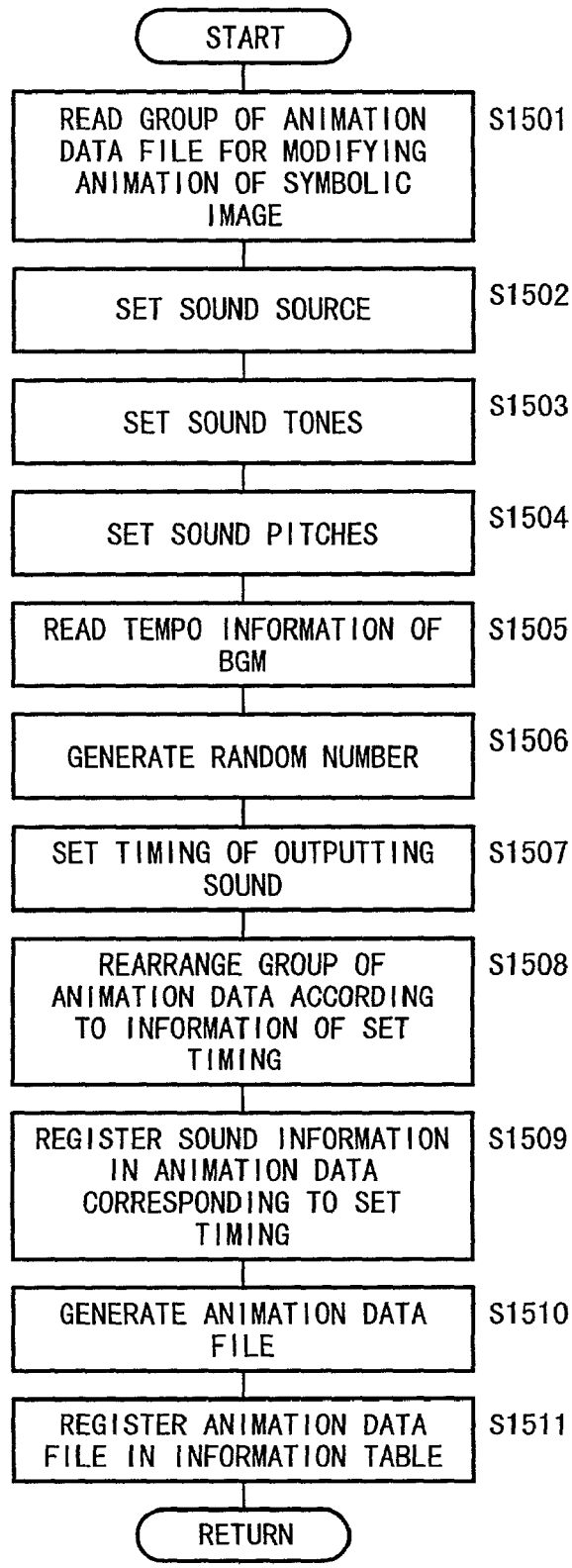
FIG. 37 is a flowchart showing a processing sequence of modified animation setting mean.

Then, in step S1109, information concerning the present animation data file 618 such as the header address of the animation data file 618 is registered in an information table 616. As shown in FIG. 34, each record of the information table 616 stores information concerning an animation data file, bit information indicating whether the record is enabled or disabled, and bit information indicating whether there is an associated record for the record or not. That is, in step S1109, the data registration of the animation data file 618 is made in a record of the information table 616 such that the record stores the header address of the present animation data file 618, bit information indicating that the record is enabled, and bit information indicating that there is no associated record for the record.

When the process in step S1109 is finished, the processing sequence of the basic image setting means 604 is brought to an end.

Then, control passes back to the main routine of FIG. 30. In step S1010, it is determined whether the data entry from the mouse 417 or the left or right joystick 70, 72 is finished or not. Specifically, it is determined whether the coordinate data entry from the mouse 417 is finished or not, or whether the pressing of the control button 70a of the left joystick 70 or the control button 72a of the right joystick 72 is finished or not.

If the data entry is not finished, control passes to step S1017 for performing the processes in step S1017 and the subsequent steps. If the data entry is finished, control passes to step S1011 for performing data processing of the input graphic shape.

The data processing sequence of the input geometric shape will be described with reference to FIG. 32. In step S1201, it is determined whether it is necessary to keep the basic image 500 to be displayed on the screen or not. The determination is performed based on information concerning the present input geometric shape registered in the geometric shape information table 630.

If it is determined that it is necessary to keep the basic image 500 to be displayed on the screen, control passes to step S1202 for performing the process of the wave setting means 606. A processing sequence of the wave setting means 606 is described with reference to FIG. 35. In step S1301, a group of animation data for waving the present basic image 500 is read from the optical disk 20. Then, in step S1302, an animation data file 620 for waving the basic image 500 is generated. Thereafter, in step S1303, the generated animation data file 620 is registered in the information table 616.

When the process in step S1303 is finished, the processing sequence of the wave setting means 606 is brought to and end.

Figure 32:
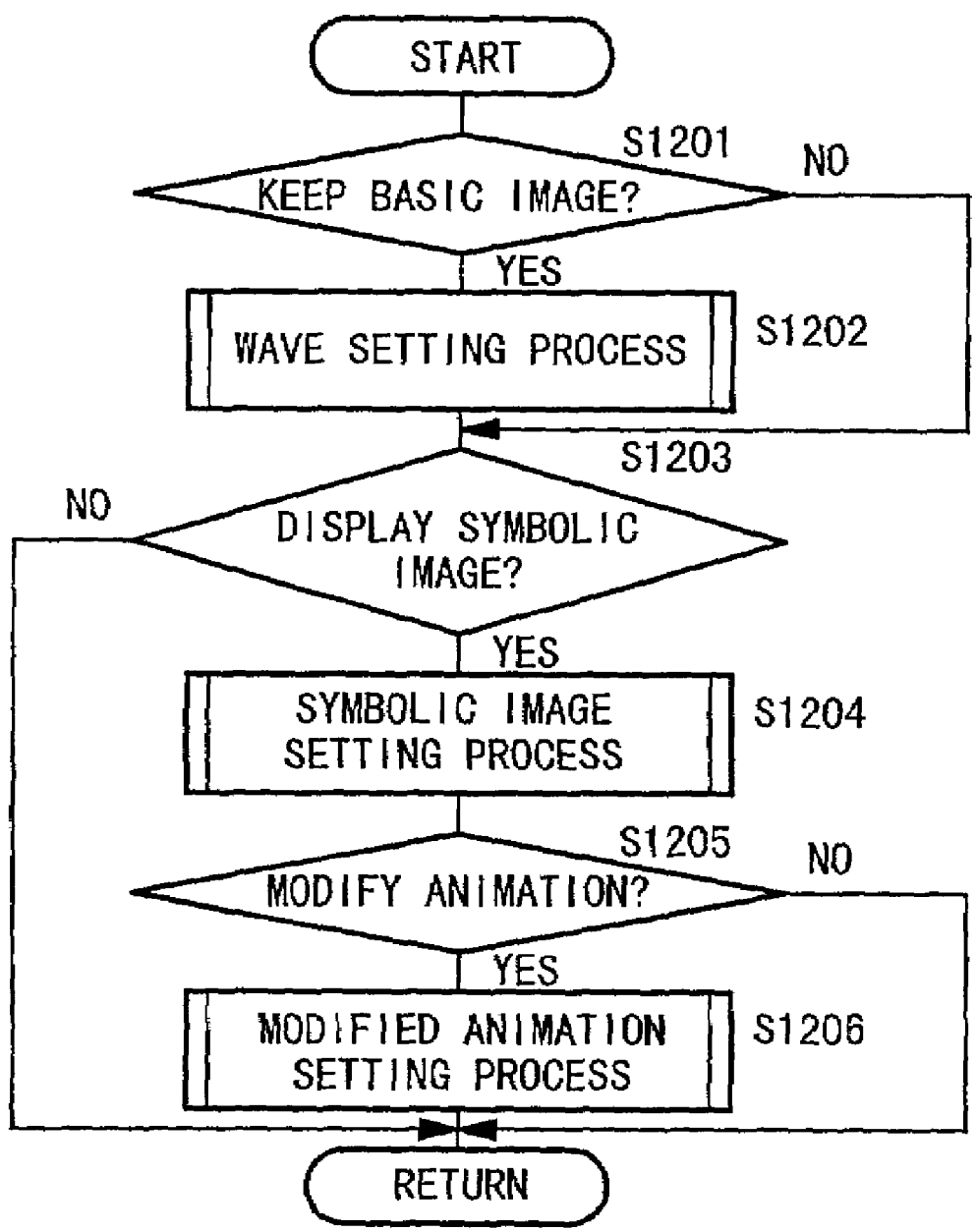
FIG. 32 is a flowchart showing data processing of an input geometric pattern.

Then, control passes back to the routine of FIG. 32. In step S1203, it is determined whether it is necessary to display a symbolic image 502 or not. Specifically, it is determined whether the value of the appearance instruction flag is "1(YES)" indicating that the drawing of symbolic images 502 is enabled or not.

If the drawing instruction flag indicates that the drawing of symbolic images 502 is enabled, control passes to step S1204 for performing the process of the symbolic image setting means 608. A processing sequence of the symbolic image setting means 608 will be described with reference to FIG. 36. In step S1401, information (e.g., an object number) of a symbolic image 502 corresponding to the present input geometric shape is read (selected) from the geometric shape information table 630 (see FIG. 28).

Then, in step S1402, a group of animation data for displaying the symbolic image 502 is read from the optical disk 20. Then, in step S1403, an animation data file 622 for displaying the symbolic image 502 is generated based on the read group of animation data. The symbolic image 502 appears on the screen according to an animation pattern set in the animation data file 622.

Then, in step S1404, information (sound information) concerning sounds to be outputted at the time of displaying the symbolic image 502 is read from the sound information table 632 based on the type of the input geometric shape, for example. Then, in step S1405, the read sound information is registered in the animation data selected from the group of animation data registered in the animation data file 622.

Then, in step S1406, information concerning the present animation data file 622 such as the header address of the animation data file 622 is registered in the information table 616. That is, in step S1406, the data registration of the animation data file 622 is made in a record of the information table 616 such that the record stores the header address of the present animation data file 622, bit information indicating that the record is enabled, and bit information concerning an associated record.

If the moving pattern (animation pattern) of the symbolic image 502 needs to be modified (changed) on the screen, the record stores bit information indicating that there is an associated record. If the moving pattern of the symbolic image 502 needs not to be changed and the symbolic image 502 disappears from the screen, the record stores bit information indicating that there is no associated record.

When the process in step S1406 is finished, the processing sequence of the symbolic image setting means 608 is brought to an end.

Control passes back to the routine of FIG. 32. In step S1205, it is determined whether it is necessary to change or modify the moving pattern of the symbolic image 502 or not. The determination is performed based on information corresponding to the present input geometric shape registered in the geometric shape information table 630.

If it is determined that it is necessary to change the moving pattern of the symbolic image 502, control passes to step S1206 for performing the process of the modified animation setting means 610. A processing sequence of the modified animation setting means 610 will be described with reference to FIG. 37. In step S1501, a group of animation data for changing the moving pattern of the symbolic image 502 is read from the optical disk 20. Then, in steps S1502 through S1508, information (sound information) concerning sounds to be outputted while the present symbolic image 502 is moving is generated.

Specifically, in step S1502, sound source information is read from the sound information table 632 based on the type of the input geometric shape and coordinate data indicating the display area of the input geometric shape. Then, in step S1503, tones of sounds are set based on the size (zoom ratio) of the symbolic image 502. Then, in step S1504, pitches of sounds are set based on coordinate data indicating the display area of the symbolic image 502.

Then, in step S1505, tempo information concerning the present BGM is read from a scene information table. Then, in step S1506, a random number is generated. Then, in step S1507, a timing of outputting sounds is set based on the read tempo information and the random number. At this time, sound information is generated.

Next, in step S1508, rearrangement in the group of animation data is performed based on the timing set in step S1507. For example, it is assumed that the flower symbolic image 502 which expands and contracts vertically as shown in FIG. 20B is the present symbolic image 502. In this case, the rearrangement of animation data is performed such that the sounds set in steps S1503 and S1504 are outputted from a speaker when the flower image 502 stretches out upwardly. Specifically, the rearrangement of animation data is carried out by shifting items of animation data according to the sound information (timing information).

Then, in step S1509, the sound information is registered in animation data corresponding to the timing set in step S1507.

Then, in step S1510, an animation data file 624 for changing the moving pattern of the symbolic image 502 is generated. That is, the symbolic image 502 appeared on the screen according to an animation pattern set in the animation data file 622 changes its moving pattern to move according to a new animation pattern set in the animation data file 624. Then, in step S1511, information of the present animation data file 624 is registered in a record of the information table 616, i.e., in a record associated with a record containing information of the animation data file 622. In this manner, the animation data file 624 is associated with the animation data file 622. Specifically, data registration of the present animation data file 624 is made in a record of the information table 616 such that the record stores the header address of the present animation data file 624, bit information indicating that the record is disabled, and bit information indicating that there is no associated record for the record.

When an animation of the symbolic image 502 according to an animation pattern set in the animation data file 622 is finished, the associated record containing information of the animation data file 624 is updated. Specifically, bit information indicating that the record is disabled is updated to indicate that the record is enabled. In this manner, the record containing the information of the animation data file 624 is enabled and the symbolic image 502 moves according to a new animation pattern set in the animation data file 624.

When the process in step S1511 is finished, the processing sequence of the modified animation setting means 610 is brought to an end.

Then, in the routine of FIG. 32, when the process of the modified animation setting means 610 in step S1206 is finished, or if it is determined that it is not necessary to display a symbolic image 502 in step S1203, or if it is determined that it is not necessary to change the moving pattern of the symbolic image 502 in step S1205, the data processing of the input geometric shape is brought to an end.

Then, control passes back to the main routine of FIG. 30. When the data processing of the input geometric shape in step S1011, or any one of the processes in steps S1013, S1015, and S1016 is finished, or if it is determined that there is no data entry in step S1007, control passes to step S1017 for performing the process of the image/sound setting means 612.

A processing sequence of the image/sound setting means 612 will be described with reference to FIG. 38. In step S1601, an index register i for retrieving a record from the information table 616 is initialized by registering an initial value "0" in the index register i.

Then, in step S1602, an i-th record of the information table 616 is read. Then, in step S1603, it is determined whether the read record contains data for ending the process of the image/sound setting means 612 or not. Specifically, it is determined whether the read record contains EOF (End of File) data or not.

If it is determined that the read record does not contains data for ending the process of the image/sound setting means 612, control passes to step S1604. In step S1604, it is determined whether the present record is enabled or not. Specifically, it is determined whether bit information of the present record indicates that the record is enabled or not.

If it is determined that the present record is enabled, an animation data file corresponding to a header address registered in the i-th record is read from animation data files.

Then, in step S1606, object data corresponding to an object number stored in the read animation data file is read. Thereafter, in step S1607, animation data corresponding to an index (initial value of the index is "0") stored in the animation data file is read.

Then, in step S1608 it is determined whether there is another animation data or not. Specifically, it is determined whether the read data contains EOD (End of Data) or not.

Then, in step S1609, vertex data of object data is updated based on the animation data, drawing color data, zoom ratio, or the like. Then, in step S1610, a rendering process for the present object data is performed to generate a three-dimensional image data corresponding the object number in the image memory 405.

Figure 39:
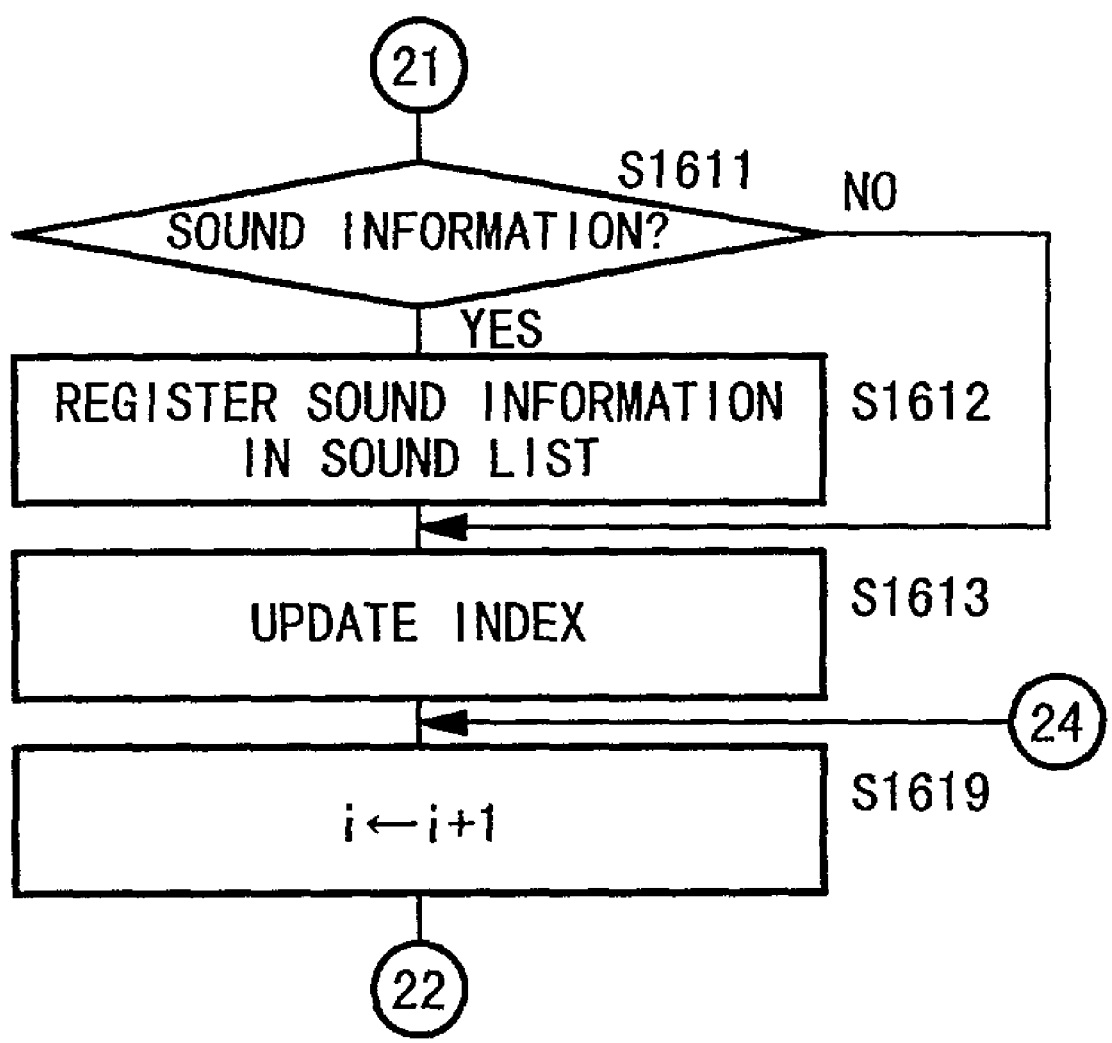
FIG. 39 is a flowchart (No. 2) showing a processing sequence of the image/sound setting means.

Next, in step S1611 of FIG. 39, it is determined whether sound information is registered in the animation data or not. If it is determined that sound information is registered in the animation data, control passes to step S1612 for reading the sound information and registering the read sound information in the sound list 628. Then, in step S1613, the value of the index stored in the animation data file is incremented by 1.

Figure 38:
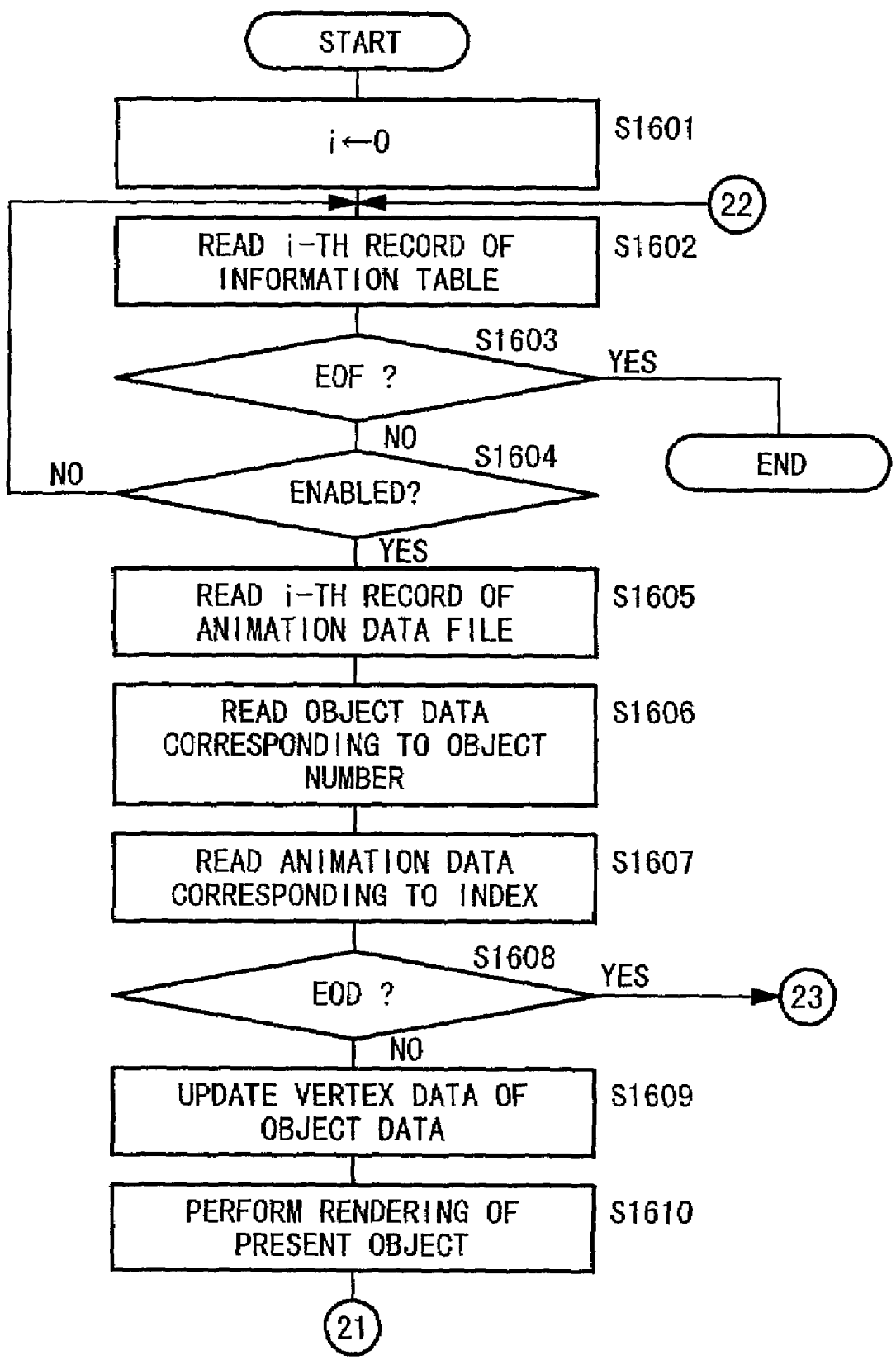
FIG. 38 is a flowchart (No. 1) showing a processing sequence of image/sound setting means.

If it is determined that there is no animation data in step S1608 of FIG. 38, control passes to step S1614 for determining whether it is necessary to repeat the animation of the present animation data file or not. The determination is performed based on the object number.

If it is determined that it is not necessary to repeat the animation of the present animation data file, control passes to step S1615 for determining whether it is necessary to display an animation of an associated animation data file or not. The determination is performed based on bit information indicating whether there is an associated record for the present record or not.

If it is necessary to display an animation of an associated animation data file, control passes to step S1616 for enabling the record of the associated animation data file in the information table 616. That is, the associated record is updated to store bit information indicating that the record is enabled.

When the process in step S1616 is finished, or if it is not necessary to display an animation of an associated animation data file, control passes to step S1617. In step S1617, the present record (i-th record) is deleted from the information table 616.

If it is determined that it is necessary to repeat the animation of the present animation data file, control passes to step S1618 for initializing the index stored in the present animation data file.

Figure 40:
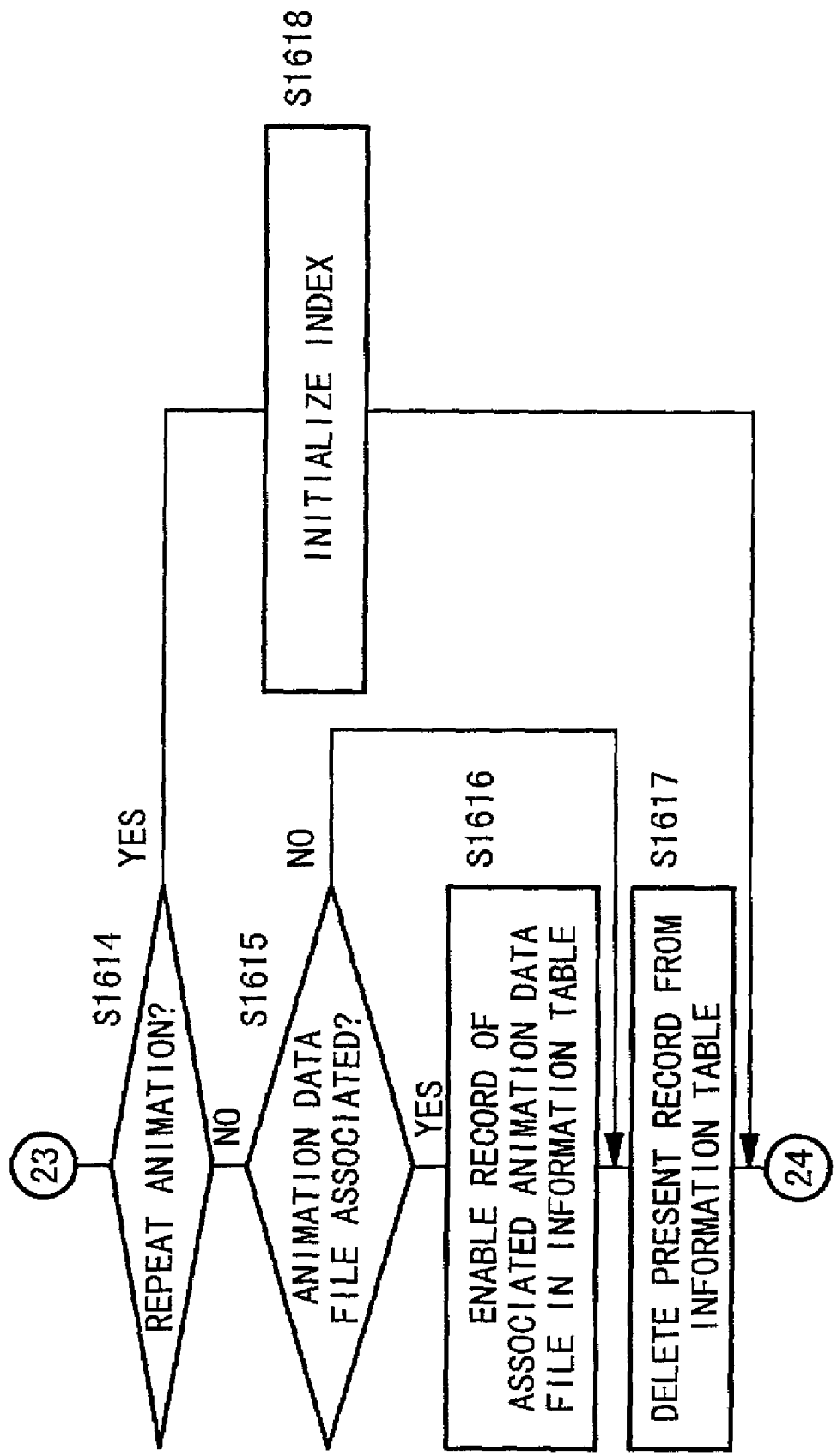
FIG. 40 is a flowchart (No. 3) showing a processing sequence of the image/sound setting means.

When the process in step S1617 or the process in step S1618 of FIG. 40 is finished, or when the process in step S1613 of FIG. 39 is finished, control passes to step S1619 for updating the index register i by incrementing the value of the index register i by 1.

When the process in step S1619 is finished, or if it is determined that the present record is disabled in step S1604 of FIG. 38, control passes back to step 1602 for reading the next record in the information table 616 to perform the process according to data of the read record.

If it is determined that the read record contains data for ending the process of the image/sound setting means 612 in step S1603, the process of the image/sound setting means 612 is brought to an end.

Control passes back to the main routine of FIG. 30. In step S1018, the process of the image/sound outputting means 614 is performed. A processing sequence of the image/sound outputting means 614 is shown in FIG. 41. In step S1701, the image data stored in the image memory is outputted on the monitor 18.

Then, in step S1702, an index register j for retrieving sound information from the sound list 628 is initialized by registering an initial value "0" in the index register j.

Then, in step S1703, j-th sound information is read from the sound list 628. Then, in step S1704, it is determined whether the read information is data for ending the process of the image/sound outputting means 614 or not. Specifically, it is determined whether the read information is EOF (End of File) data or not.

If it is determined that the read information is not data for ending the process of the image/sound outputting means 614, control passes to step S1705 for outputting the read sound information to the SPU 420. The SPU 420 receives the sound information and read sound patterns from the sound buffer 422 based on sound source information or the like registered in the sound information. Then, the sound patterns are synthesized based on information concerning sound lengths, sound pitches, sound types or the like to output sounds from the speaker 626.

Then, in step S1706, the index register j is updated by incrementing the value of the index register j by 1. Then, control passes back to step S1703 for outputting next sounds based on the next sound information. If it is determined that the read information is data for ending the process of the image/sound outputting means 614 in step S1704, the processing sequence of the image/sound outputting means 614 is brought to an end.

In general, the sound patterns are synchronously outputted from the SPU 420 to the speaker 626. That is, many sounds are multiplexed and outputted simultaneously from the speaker 626.

Control passes back to the main routine of FIG. 30. In step S1019, it is determined whether there is a request for ending the current scene from the user or not. Specifically, it is determined whether the user inputted a command for displaying the menu screen or not. If it is determined that there is no request for ending the current scene, control passes back to step S1006 of FIG. 29 for repeating the processes in step S1006 and the subsequent steps.

By repeating the processes in steps S1006 through S1019, the user can draw another basic image 500 having nodal points according to a drawing direction of the mouse 417, or the left or right joystick 70, 72 to the accompaniment of sounds, and thereafter, draw another symbolic image 502 to the accompaniment of sounds. If it is necessary to move the symbolic image 502 according to a certain animation pattern, an animation of the symbolic image 502 is displayed on the screen such that the symbolic image 502 moves at a tempo of a BGM and distinctive sounds of the symbolic image 502 is reproduced in timing with the movement of the symbolic image 502. Tones of the sounds are determined based on the input geometric shape and pitches of the sounds are determined based on the display area of the input geometric shape.

If it is determined that there is a request for ending the current scene from the user, control passes to step S1020. In step S1020, it is determined whether there is a program ending request (pressing of the reset switch, power off, etc.) or not. If there is no program ending request, control passes back to step S1001 of FIG. 29 for repeating the processes in step S1001 and the subsequent steps. If there is a program ending request, the process of the image processing means 600 is brought to an end.

As described above, according to the image processing means 600 of the modified embodiment, the symbolic image 502 displayed on the screen moves according to a BGM arbitrarily. Accordingly, the symbolic image 502 not only simply appears on the screen but also dances in timing with the BGM. Accordingly, a further amusing aspect can be added to the video game.

Distinctive sounds of the symbolic image 502 can be outputted synchronously with the movement of the symbolic image 502 displayed on the screen. Further, tones of sounds can be set based on at least the size of the symbolic image 502 and pitches of sounds can be set based on at least the position of the symbolic image 502. Thus, it is possible for the user to draw geometric shapes and compose a music piece in a video game. Accordingly, the video game can be enjoyed in various ways.

Since an animation of the basic image 500 displayed according to the input geometric shape can be set such that the basic image 500 waves arbitrarily, an animation of the dancing symbolic image 502 can be made more interesting. Accordingly, it is possible to provide an interesting video game which can be enjoyed by users of various generations.

The recording medium, the program, the entertainment system, and the entertainment apparatus of the present invention shall not be limited to the embodiments disclosed herein. It will be apparent to a person skilled in the art that various modifications may be made without departing from the gist of the present invention.

What is claimed is:

1. An entertainment system comprising:
   an entertainment apparatus having a control unit for executing various programs;
   at least one input device for inputting a manual control request of a user to said entertainment apparatus;
   a monitor for displaying an image outputted from said entertainment apparatus;
   first means for extracting data successively inputted by a user by operating said input device and displaying a pattern image based on said extracted data;
   second means for displaying an image other than said pattern image from an area where said pattern image is displayed;
   third means for determining whether said pattern image based on said data extracted by said first means satisfies a predetermined judging criterion or not;
   fourth means for maintaining display of said image displayed by said second means if said third means determines that said pattern image satisfies said predetermined judging criterion; and
   fifth means for changing said image displayed by said second means to another image and displaying said another image if said third means determines that said pattern image does not satisfy said predetermined judging criterion.

2. An entertainment system according to claim 1, wherein said third means determines whether said pattern image displayed by said first means satisfies said predetermined judging criterion or not by calculating the number of deviations from an allowable range of said judging criterion.

3. An entertainment system according to claim 1, further comprising sixth means for outputting predetermined music, wherein said fifth means displays said image displayed by said second means on said monitor such that said image moves arbitrarily in accordance with said predetermined music outputted by said sixth means.

4. An entertainment system according to claim 3, wherein said sixth means outputs sounds synchronously with the movement of said image.

5. An entertainment system according to claim 4, wherein said sixth means changes tones of sounds based on at least the size of said image displayed by said second means.

6. An entertainment system according to claim 4, wherein said sixth means changes pitches of sounds based on at least the position of said image displayed by said second means.

7. An entertainment system according to claim 1, wherein said first means displays said pattern image such that said pattern image waves arbitrarily.

8. An entertainment apparatus connectable to an input device for inputting a manual control request of a user to said entertainment apparatus and connectable to a monitor for displaying an image outputted from said entertainment apparatus, wherein said entertainment apparatus comprises:
   first means for extracting data successively inputted by a user by operating said input device and displaying a pattern image based on said extracted data;
   second means for displaying an image other than said pattern image from an area where said pattern image is displayed;
   third means for determining whether said pattern image based on said data extracted by said first means satisfies a predetermined judging criterion or not;
   fourth means for maintaining display of said image displayed by said second means if said third means determines that said pattern image satisfies said predetermined judging criterion; and
   fifth means for changing said image displayed by said second means to another image and displaying said another image if said third means determines that said pattern image does not satisfy said predetermined judging criterion.

9. An image displaying method used for an entertainment system including an entertainment apparatus having a control unit for executing various programs, at least one input device for inputting a manual control request of a user to said entertainment apparatus, and a monitor for displaying an image outputted from said entertainment apparatus, said image displaying method comprising the steps of:
   first step of extracting data successively inputted by a user by operating said input device and displaying a pattern image based on said extracted data;
   second step of displaying an image other than said pattern image from an area where said pattern image is displayed;
   third step of determining whether said pattern image based on said data extracted in said first step satisfies a predetermined judging criterion or not;
   fourth step of maintaining display of said image displayed in said second step if in said third step, it is determined that said pattern image satisfies said predetermined judging criterion; and
   fifth step of changing said image displayed in said second step to another image and displaying said another image if in said third step, it is determined that said pattern image does not satisfy said predetermined judging criterion.

* * * * *